(12) United States Patent
Tanaka et al.

(10) Patent No.: US 8,004,748 B2
(45) Date of Patent: Aug. 23, 2011

(54) THERMAL LENS FORMING ELEMENT

(75) Inventors: Norio Tanaka, Tokyo (JP); Shigeru Takarada, Tokyo (JP); Takashi Hiraga, Ikeda (JP); Ichiro Ueno, Ikeda (JP); Nobutaka Tanigaki, Ikeda (JP); Noritaka Yamamoto, Ikeda (JP); Toshiko Mizokuro, Ikeda (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 0 days.

(21) Appl. No.: 12/735,200

(22) PCT Filed: Dec. 4, 2008

(86) PCT No.: PCT/JP2008/072465
§ 371 (c)(1),
(2), (4) Date: Jun. 21, 2010

(87) PCT Pub. No.: WO2009/081742
PCT Pub. Date: Jul. 2, 2009

(65) Prior Publication Data
US 2010/0265568 A1  Oct. 21, 2010

(30) Foreign Application Priority Data

Dec. 25, 2007  (JP) ................................. 2007-333311
Jan. 9, 2008   (JP) ................................. 2008-001808

(51) Int. Cl.
*G02F 1/29* (2006.01)
*G02F 1/01* (2006.01)

(52) U.S. Cl. ....................................... 359/299; 359/288

(58) Field of Classification Search .................. 359/299, 359/288, 665, 666; 356/432, 441, 437, 234; 385/16, 33
See application file for complete search history.

(56) References Cited

U.S. PATENT DOCUMENTS
6,265,708 B1  7/2001  Tanaka et al.
(Continued)

FOREIGN PATENT DOCUMENTS
JP   B2-3504076   12/2003
(Continued)

OTHER PUBLICATIONS

D. Solimini, "Loss Measurement of Organic Materials at 6328 A," *Communications*, pp. 3314-3315, 1966.

(Continued)

*Primary Examiner* — William C Choi
*Assistant Examiner* — Tuyen Tra
(74) *Attorney, Agent, or Firm* — Oliff & Berridge, PLC

(57) ABSTRACT

A thermal lens forming element includes a first chamber serving as a control light absorbing region, which is configured as a columnar body or an N prismatic body (wherein N is an integer equal to or greater than 4) circumscribing the columnar body and filled with a control light absorbing dyestuff solution containing a solvent having a viscosity of 0 to 3 mPa·s at 160° C. or above and a ratio of the viscosity of the solvent at 160° C. to a viscosity of the solvent at 40° C. not less than 1 and not greater than 6, wherein the columnar body or the N prismatic body circumscribing the columnar body has a central axis coinciding with an optical axis of incident signal light. The first chamber is connected to a second chamber via a solution channel and a dam. The dyestuff solution and a bubble of an inert gas are confined in the second chamber.

8 Claims, 21 Drawing Sheets

U.S. PATENT DOCUMENTS

| | | | |
|---|---|---|---|
| 7,079,315 B2 * | 7/2006 | Kitamori et al. | 359/368 |
| 2005/0248844 A1 | 11/2005 | Ueno et al. | |
| 2007/0104417 A1 | 5/2007 | Tanaka et al. | |
| 2009/0022453 A1 | 1/2009 | Ueno et al. | |

FOREIGN PATENT DOCUMENTS

| | | |
|---|---|---|
| JP | B2-3809908 | 6/2006 |
| JP | B2-3906926 | 1/2007 |
| JP | A-2007-225825 | 9/2007 |
| JP | A-2007-225826 | 9/2007 |
| JP | A-2007-225827 | 9/2007 |
| WO | WO 2007/099979 A1 | 9/2007 |

OTHER PUBLICATIONS

Hiraga et al., "Development of an Optically gated Optical Switch using an Organic Dye—Applied to Local Telecommunication Technology," *Proc. Of SPIE*, vol. 6891, pp. 68910g-1-68910g-15, Jan. 22, 2008.

Ueno et al., "Coaxial Configuration of the Gating and Signal Light for a Switching Device of a Dye-Dissolved Polymer Film," *Japan J. Appl. Phys.*, vol. 42, Part 1, No. 3, pp. 1272-1276, Mar. 2003.

International Search Report issued in Application No. PCT/JP2008/072465; Mailed on Mar. 19, 2009.

Written Opinion of the International Searching Authority issued in Application No. PCT/JP2008/072465; Mailed on Mar. 19, 2009.

* cited by examiner

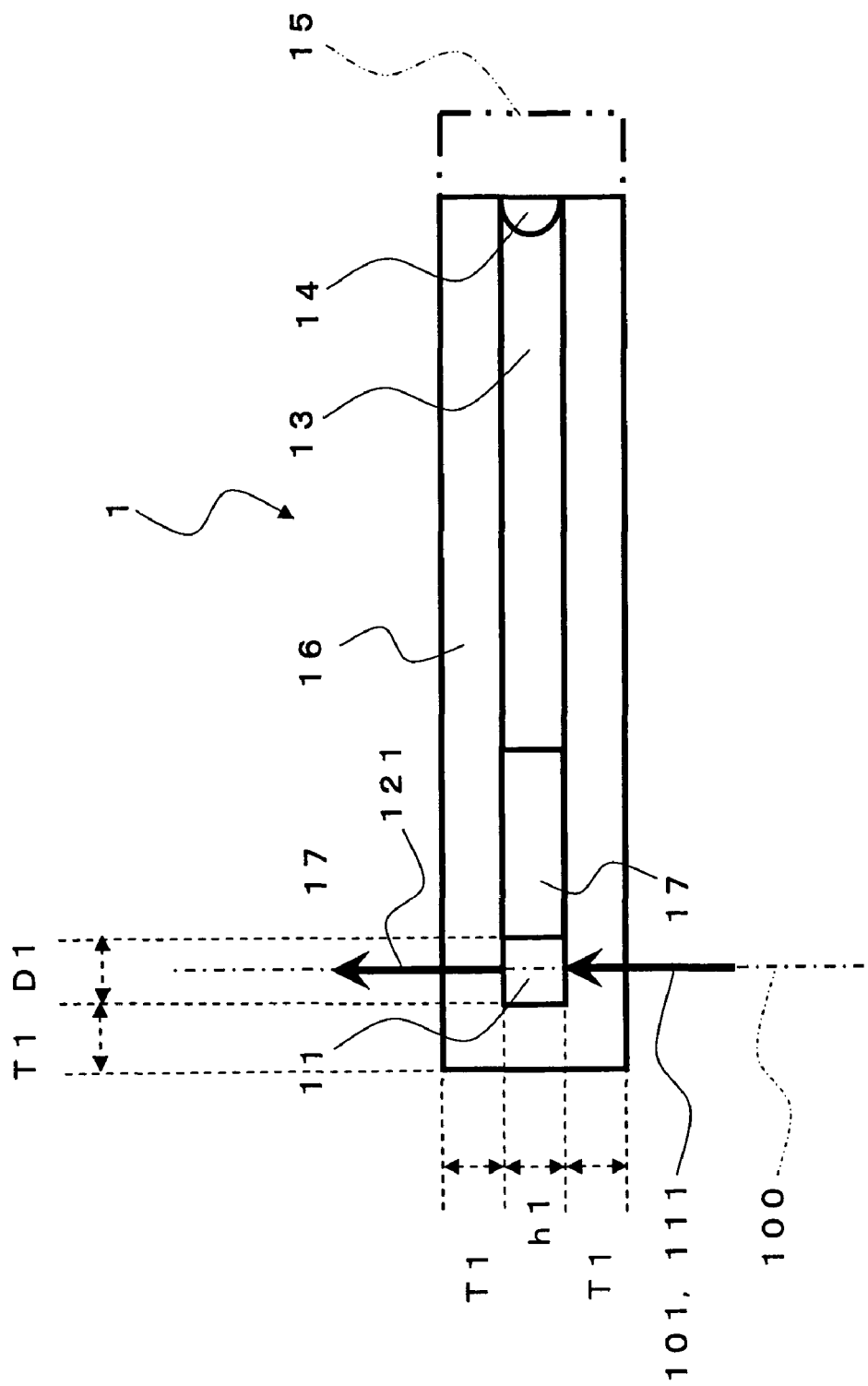

THERMAL LENS FORMING ELEMENT

TECHNICAL FIELD

The present invention relates to a thermal lens forming element usable for an optical path switching apparatus or an optical path switching method, which can be preferably used in the field of optical electronics and photonics, such as optical communications and optical information processing.

BACKGROUND ART

As discussed in patent literature 1, inventors of the present invention have proposed a method and an apparatus for switching an optical path based on a new principle, according to which a control light absorbing region of a thermal lens forming element is irradiated with control light having a wavelength selected from a wavelength band absorbed by the control light absorbing region and signal light having a wavelength selected from a wavelength band not absorbed by the control light absorbing region. When the control light and the signal light are converged, their optical axes accord with each other. According to the above-described method and apparatus, the optical path changes in the following manner. If the thermal lens forming element is not irradiated with the control light, the signal light travels straight via a hole of a mirror. On the other hand, if the thermal lens forming element is irradiated with the control light, the signal light is reflected by the holed mirror which is inclined relative to the traveling direction of the signal light. Background arts of the invention are described in detail in patent literature 1.

As discussed in patent literature 2, the inventors of the present invention have also proposed an optical control system optical path switching type light signal transmission apparatus and a method for switching light signal optical path, according to which usage of a plurality of thermal lens forming elements combined with holed mirrors is described. In the optical path switching system discussed in patent literature 1 and patent literature 2, when the thermal lens forming element is irradiated with the control light, the signal light becomes a beam having a ring shape in its cross section due to thermal lens effect. Hence, this system is referred to as "ring beam system."

Furthermore, as discussed in patent literatures 3 to 5, the inventors of the present invention have proposed a light deflection method and an optical path switching apparatus, according to which a thermal lens forming optical element has a control light absorbing region, wherein control light having a wavelength selected from a wavelength band absorbed by the control light absorbing region and signal light having a wavelength selected from a wavelength band not absorbed by the control light absorbing region are incident on the control light absorbing region of the thermal lens forming optical element. The control light absorbing region is convergently irradiated with the control light and the signal light. The control light and the signal light have convergence points different in their positions. Both the control light and the signal light converge and then diffuse on or near an incident plane of the control light absorbing region in the light traveling direction. Accordingly, the temperature of the control light absorbing region increases at a portion where the control light is absorbed and its peripheral region, and a thermal lens is reversibly formed in this region. The refractive index varies and, as a result, the signal light changes its traveling direction.

In patent literatures 3 to 5, the control light absorbing region of a thermal lens forming optical element is configured as a glass container filled with a solution containing at least one dyestuff dissolved in a solvent. The solvent, capable of dissolving the dyestuff, is the one not thermally decomposed when the temperature rises in the process of thermal lens formation. It is desired that the boiling point of the solvent is not lower than 100° C., preferably not lower than 200° C., more preferably not lower than 300° C.

However, patent literatures 3 to 5 describe nothing about temperature dependency in refractive index and viscosity of the solvent. In the optical path deflection system discussed in patent literatures 3 to 5, the signal light maintains a circular shape in its beam cross section even when the thermal lens forming optical element is irradiated with the control light. Hence, this system is referred to as "circular beam system."

As discussed in patent literature 6, some of the inventors of the present invention have proposed an optical control method, according to which an optical cell filled with a photosensitive liquid composition is irradiated with control light having a wavelength to which the photosensitive composition is sensitive. The optical control method includes reversibly changing the transmissivity and/or refractive index of signal light having a wavelength selected from a wavelength band different from that of the control light, to perform intensity modulation and/or light flux density modulation on the signal light passing through the optical cell.

The optical control method includes irradiating the optical cell with the control light and the signal light converged thereon. The optical paths of the control light and the signal light are disposed so that regions near the foci of the control light and the signal light, where the photon density is highest, are overlapped with each other in the photosensitive composition of the optical cell. The pencil of light of the signal light diffusing after passing through the photosensitive composition in the optical element is received by a convex lens or a concave mirror having a numerical aperture smaller than that of a converging unit of the signal light. Thus, the pencil of light of the signal light in a region strongly subjected to the intensity modulation and/or light flux density modulation can be separately taken out.

However, patent literature 6 describes nothing about temperature dependency in refractive index and viscosity of the solvent. A thermal lens forming element discussed in patent literature 6 includes two glass plates of an optical cell and a spacer, which constitute a flatten cuboidal space filled with a dyestuff solution. However, patent literature 6 describes nothing about variation in thermal lens effect occurring when the orientation of the element relative to the direction of gravity is changed.

In the history of laser optics, there are numerous researches and reports relating to the "thermal lens effect", i.e., a phenomenon occurring when an optical medium is irradiated with a laser, wherein refractive index and its distribution are changed according to an increase in temperature caused by heat generation. For example, non-patent literature 1 discusses about $\partial n/\partial T$ (a temperature coefficient of variation in refractive index) observed when a total of twenty-seven types of organic solvents are irradiated with a helium-neon laser having an oscillation wavelength of 633 nm. However, non-patent literature 1 describes nothing about temperature dependency in viscosity of the solvent.

Patent literature 1: JP 3809908 B
Patent literature 2: JP 3906926 B
Patent literature 3: JP 2007-225825 A
Patent literature 4: JP 2007-225826 A
Patent literature 5: JP 2007-225827 A
Patent literature 6: JP 3504076 B Non-patent literature 1: D. Solimini: "Loss Measurement of Organic Materials at 6328 Å", J. Appl. Phys., vol. 37, 3314-3315 (1966)

DISCLOSURE OF THE INVENTION

Problem to be Solved by the Invention

The present invention has an object to provide a thermal lens forming element capable of quickly forming a thermal lens in response to on/off of control light.

The present invention has another object to minimize variation in thermal lens effect when the orientation of a thermal lens forming element relative to the direction of gravity is changed.

Furthermore, the present invention has an object to enlarge an operable temperature range of a thermal lens forming element.

Means for Solving Problem

The present invention has the following features.

(1) A thermal lens forming element according to the preset invention includes an optical cell filled with a solution containing a dyestuff dissolved in a solvent, wherein the dyestuff does not absorb light having a wavelength identical to that of signal light and absorbs control light. The optical cell includes a control light absorbing region where at least the control light can focus. The solvent has a viscosity of 0 to 3 mPa·s at 160° C. or above, and a ratio of the viscosity of the solvent at 160° C. to a viscosity of the solvent at 40° C. is not less than 1 and not greater than 6. The control light absorbing region is convergently irradiated with the control light having a wavelength selected from a wavelength band absorbed by the control light absorbing region and the signal light having a wavelength selected from a wavelength band not absorbed by the control light absorbing region. The control light and the signal light have convergence points identical or different in their positions. A thermal lens is formed based on a distribution of the refractive index reversibly formed due to an increase in temperature at a portion where the control light is absorbed or its peripheral region in the control light absorbing region. The thermal lens forming element realizes the following states according to on/off of the control light: a state where the converged signal light is output from the thermal lens forming element with an ordinary divergence angle in a progressive direction if the control light is not emitted and the thermal lens is not formed; a state where the converged signal light is output from the thermal lens forming element with a divergence angle larger than the ordinary divergence angle if the convergence point of the control light agrees in position with the convergence point of the signal light when the thermal lens is formed under irradiation of the control light; and a state where the converged signal light is output from the thermal lens forming element with a divergence angle different from the ordinary divergence angle in a direction different from the progressive direction if the convergence point of the control light disagrees in position with the convergence point of the signal light when the thermal lens is formed under irradiation of the control light.

(2) In the thermal lens forming element described in (1), it is preferable that the control light absorbing region is configured as a columnar body or an N prismatic body (wherein N is an integer equal to or greater than 4) circumscribing the columnar body, which has a central axis coinciding with an optical axis of the signal light traveling progressively under no irradiation of the control light, wherein the signal light is incident perpendicularly on one bottom surface of the columnar body or the N prismatic body circumscribing the columnar body and output from the other bottom surface.

(3) In the thermal lens forming element described in (2), it is preferable that the height of the columnar body or the N prismatic body circumscribing the columnar body, which represents the distance between the bottom surfaces thereof, is equal to the diameter of the columnar body.

(4) In the thermal lens forming element described in (2) or (3), it is preferable that the height of the columnar body or the N prismatic body circumscribing the columnar body, which represents the distance between the bottom surfaces thereof, is 200 to 500 μm, and the diameter of the columnar body is 200 to 500 μm.

(5) In the thermal lens forming element described in (2), (3), or (4), it is preferable that the control light absorbing region configured as the columnar body or the N prismatic body circumscribing the columnar body is connected to a second chamber via a thin tube having an inner diameter of 10 to 50 μm or a dam providing a clearance of 5 to 20 μm, and the second chamber is filled with the dyestuff solution and an inert gas.

EFFECTS OF THE INVENTION

The present invention can provide a thermal lens forming element capable of realizing thermal lens effect at a higher response speed of 1 msec or less in a ring beam system, or 10 msec or less in a circular beam system, with a small power equivalent to 30 mW or less in an output of control light. Furthermore, the present invention can provide a thermal lens forming element capable of realizing thermal lens effect not varying widely when the orientation of an element is changed relative to the direction of gravity. Furthermore, the present invention can provide a thermal lens forming element usable in the temperature range of −40 to 85° C.

BRIEF DESCRIPTION OF THE DRAWINGS

FIG. 1b illustrates a cross-sectional view taken along a line C-C' illustrated in FIG. 1a.

FIG. 1c illustrates a cross-sectional view taken along a line B-B' illustrated in FIG. 1b.

FIG. 2b illustrates a cross-sectional view taken along a line D-D' of FIG. 2a.

FIG. 3b illustrates a cross-sectional view taken along a line E-E' of FIG. 3a.

Figure 1A:
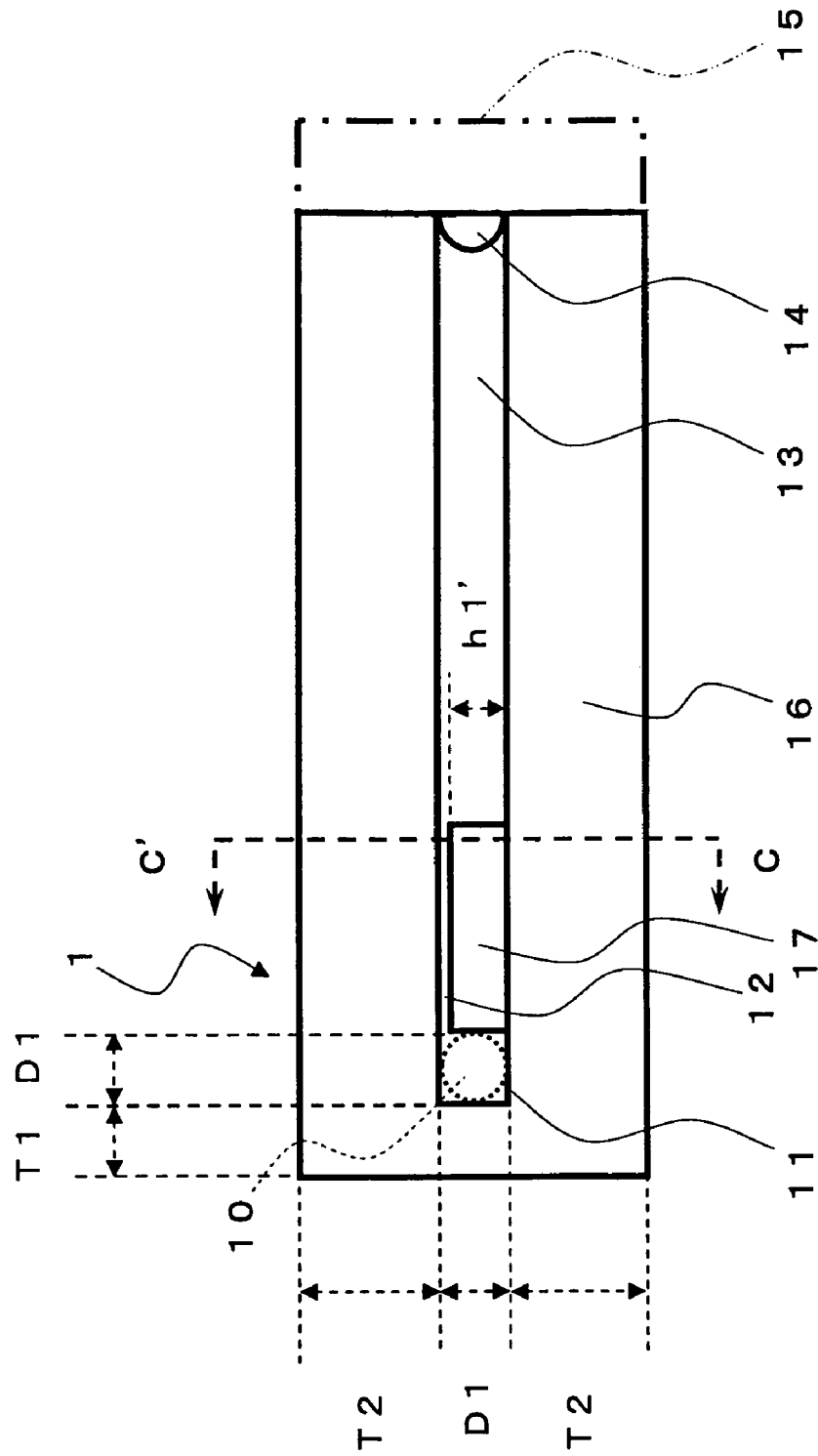
FIG. 1a illustrates a schematic arrangement of a thermal lens forming element according to a first embodiment of the present invention.

DESCRIPTION OF THE REFERENCE NUMERALS 1, 2, 3—thermal lens forming element, 10—columnar body inscribing first chamber 11, 11—cuboidal first chamber, 20—columnar first chamber, 12, 22—solution channel, 13, 23—second chamber, 14, 24, 34—bubble, 15, 25, 35—lid, 16—optical cell, 17, 27—dam, 26, 36—coin-shaped optical cell, 28, 38—dyestuff solution filling port, 33—columnar space, 40, 41, 50, 51—collimating lens, 42, 52—dichroic mirror, 43, 53—collective lens, 44, 54—light-receiving lens, 45—holed mirror, 46, 47, 56, 57—coupling lens, 100, 200, 300—optical axis of progressive signal light, 101, 201, 301—incident signal light, 111, 211, 311—incident control light, 121, 221, 321—output signal light (progressive), 400—optical fiber emitting signal light, 401—incident signal light, 410—optical fiber emitting control light, 411—incident control light, 420—optical fiber receiving progressive signal light, 421—progressive signal light, 430—optical fiber receiving optical path switched signal light, 431—optical path switched signal light, 500—optical fiber emitting signal light, 501—incident signal light, 510—optical fiber emitting control light, 511 incident control light, 520—optical fiber receiving progressive signal light, 521—progressive signal light, 530—optical fiber receiving optical path deflected signal light, 531—optical path deflected signal light, 4110—waveform of control light, 4310—waveform of signal light, D1—diameter of columnar body 10, D2—diameter of columnar space 20 (inner diameter of columnar dam 27), D3—outer diameter of coin-shaped cells 2 and 3, D4—inner diameter of coin-shaped cells 2 and 3, D5—outer diameter of columnar dam 27, D6—diameter of lids 25 and 35, D7—diameter of filling ports 28 and 38, D8—diameter of bubbles 24 and 34, T1, T3, T4, T5—thickness of glass plate members, T2—length of a side of glass plate member, h1—height of columnar body 10, h1'—height of dam 17, h2—height of columnar space 20, h2'—height of dam 27.

BEST MODE FOR CARRYING OUT THE INVENTION

Embodiments of the present invention are described below with reference to FIGS. 1 to 16.

First Embodiment

Figure 1B:
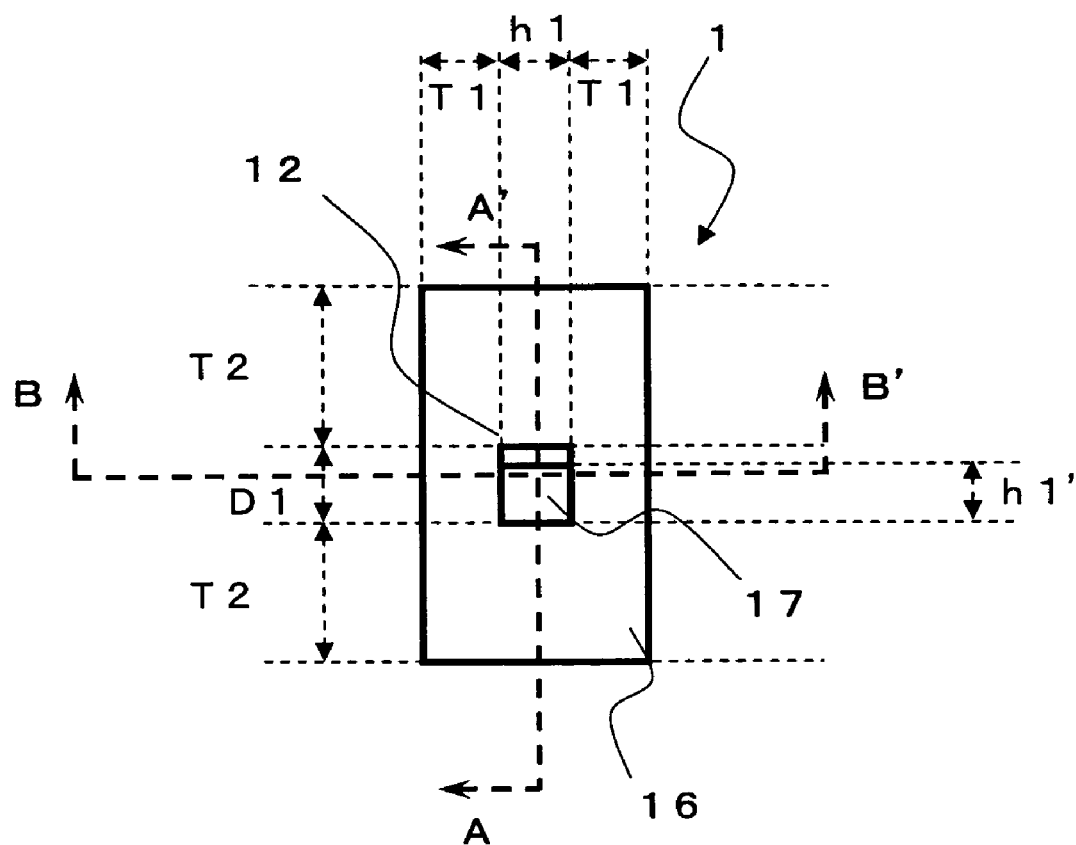

FIGS. 1a to 1c illustrate a thermal lens forming element 1 according to a first embodiment of the present invention.
[Arrangement of Thermal Lens Forming Element]
The thermal lens forming element 1 includes a first chamber 11 and a second chamber 13 formed in an optical cell 16 and filled with a solution containing a dyestuff dissolved in a solvent. The optical cell 16 has an aperture closed by a lid 15. A dam 17, provided between the first chamber 11 and the second chamber 13, defines a solution channel 12 that connects the first chamber 11 and the second chamber 13. As described below in detail, a bubble 14 (inert gas) is confined in the second chamber 13. Hereinafter, individual constituent components are described in detail.
[Optical Cell and Lid]
Quartz glass or sapphire glass is a material suitable for the optical cell 16 and the lid 15. The machining accuracy required for the optical cell 16 and the lid 15 is in a so-called "optical contact" level, which requires no adhesive to hermetically bond two parts at polished surfaces thereof. For example, a fusion bonding method for manufacturing the optical cell 16 includes combining a plurality of parts made of quartz glass (or sapphire glass) with each other at their polished surfaces and uniformly heating them at a higher temperature near the melting point, to bond them along their "optical contact" surfaces.

It is preferable that a plate member made of quartz glass, constituting the optical cell 16 and the lid 15, has the thickness T1 of 350 μm to 500 μm. If the thickness T1 is less than 350 μm, the strength of a plate member is insufficient and may be broken when polished. If the thickness T1 is greater than 500 μm, the beam shape of converged incident signal light or diffused/deflected outgoing signal light tends to deteriorate due to refraction. If the thickness T1 is in the above-described range, the length T2 of a side of a glass plate member can be set to any value.

When a plate member is made of quartz glass, it is desired to apply a non-reflective coating to a plane on which signal light and control light are incident and a plane from which the signal light is output. When a plate member is made of sapphire glass, its intensity may be sufficient even when the thickness T1 is equal to or less than 100 μm.

However, considering the accuracy in polishing and fusion bonding processes performed on an end surface, it is preferable that the plate member has the thickness T1 of 200 to 500 μm. When a plate member is made of sapphire glass, it is required to apply a non-reflective coating to a plane on which signal light and control light are incident and a plate from which the signal light is output. The dam 17 and the solution channel 12 are formed by cutting, polishing, and fusion bonding a glass member having a shape matching with the shape of the first chamber 11 so that the dam 17 has a height h1' of 485 μm.

The shape of the first chamber 11 in the optical cell 16 is, for example, a symmetric shape, such as a square pole, a pentagonal prism, or a hexagonal column, which circumscribes a columnar body 10 whose central axis accords with an optical axis 100 of incident signal light 101. Considering easiness in machining, an optimum shape of the first chamber 11 is a square pole as illustrated in FIG. 1. Furthermore, it is desirable that the shape of the first chamber 11 accords with a diameter D1 and a height h1 of the columnar body 10. The first chamber 11 having the above-described shape is filled with a dyestuff solution to constitute a control light absorbing region. The signal light 101 and control light 111 are incident on one bottom surface of the columnar body 10 and output from the other bottom surface. In this manner, when the shape of the control light absorbing region is symmetrical, a uniform thermal lens is formed in the control light absorbing region.

More specifically, a high-temperature/low-density region constantly causes a convective movement in the gravity field regardless of the gravity direction of the optical cell 16. Thus, substantially uniform thermal lens effect can be obtained regardless of the gravity direction of the thermal lens forming element 1. Furthermore, in the disappearing process of the thermal lens formed in the control light absorbing region in response to on/off control of the control light, the dyestuff solution can be efficiently cooled down because the dyestuff solution is completely surrounded by the glass material having a higher thermal conductivity. As a result, the thermal lens can speedily respond to the on/off control of the control light.

To effectively form a thermal lens in the control light absorbing region, it is required that a significant amount of thermal energy is stored in a specific region. For example, if a dyestuff thin film is directly formed on a glass substrate by vacuum evaporation, the heat generated by converged and irradiated control light immediately diffuses and therefore thermal lens effect is not detectable.

To compare the intensity of control light with the magnitude of thermal lens effect, the diameter D1 of the columnar body 10 was set to 500 μm and the height of the columnar body 10, i.e., the thickness of the dyestuff solution (optical path length), was changed to 25, 50, 100, 200, 500, and 1000 μm. The control light was, for example, set to have a wavelength of 650 to 980 nm. In this case, when the dyestuff solution has a thickness of 25 to 100 μm, the magnitude of the thermal lens effect does not change even if the intensity of the control light is increased.

Furthermore, when the dyestuff solution has a thickness of 1000 μm, no specific merit was recognized and rather the beam shape of output signal light was adversely influenced by the refraction. Therefore, it is desired that the height h1 of the columnar body 10 is set to 200 to 500 μm. It is desired that the diameter D1 of the columnar body 10 is identical to the height h1 of the columnar body 10. It is desired that the height h1 of the columnar body 10 is set to a value in the range of 200 to 500 μm. In the above-described evaluation test, the "magnitude of thermal lens effect" is clearly detectable and compared as the size of a ring on a cross section of output signal light in the ring beam system, or as the deflection angle of signal light output from the thermal lens forming element in the circular beam system.

[Adhesive]

It is inevitable that a method for bonding the lid 15 to the optical cell 16 does not require a heating process or a heat generation process. If the dyestuff solution filled in the first chamber 11 and the second chamber 13 of the optical cell 16 expands due to an increase in temperature, the dyestuff solution may leak out of the chamber along a contact surface between the optical cell 16 and the lid 15 or contaminate the contact surface. Therefore, it is recommendable to use the adhesive satisfying the following requirements.

(a) The adhesive cures at or below the room temperature.
(b) The adhesive is not soluble in a solvent contained in the dyestuff solution filled in the optical cell 16.
(c) The adhesive does not swell in the solvent.
(d) The adhesive does not transmit vapor of the solvent.
(e) The adhesive does not transmit oxygen gas if it deteriorates the dyestuff solution.
(f) The adhesive does not transmit water vapor if it deteriorates the dyestuff solution.
(g) The adhesive does not transmit carbon dioxide, carbon monoxide, and sulfur dioxide if they deteriorate the dyestuff solution.
(h) The adhesive does not include any adhesive component or curing agent that does not react to components contained in the dyestuff solution.

An epoxy resin adhesive including amine or anhydride serving as polymerization initiator and satisfying the above-described conditions (a) to (h) can be selected and used as a preferred adhesive.

The ultraviolet curing resin and the electron radiation curing resin are not suitable, although they do not require direct heating, because the temperature of the resin increases due to the heat partly converted from the energy of an absorbed ultraviolet ray or an electron beam when they are used to bond the lid 15 with the optical cell 16.

To facilitate the understanding, if oxygen or water components deteriorate a dyestuff solution, it is preferable to handle the dyestuff solution in a vacuum system, in a closed system, in an inert gas atmosphere realized by a high-performance glove box, or in nonaqueous conditions. In this case, cyanoacrylate adhesives are not suitable because a curing reaction of the cyanoacrylate adhesive occurs when the water adheres to a bonding surface of the lid 15 and the optical cell 16. If the dyestuff solution is not influenced by the water, any cyanoacrylate adhesive can be used when it satisfies the above-described conditions (a) to (h).

[Dyestuff]

The dyestuff used for a thermal lens forming element according to the present invention satisfies the following severe requirements.

(A) The dyestuff is sufficiently durable against irradiation of a converging laser in a wavelength band capable of absorbing control light for at least 2,000 hours or, if possible, durable over several tens of thousands of hours.

(B) The dyestuff is sufficiently durable against a temperature rise exceeding 200° C. at a convergence position of the converging laser in a wavelength band capable of absorbing control light for at least 2,000 hours or, if possible, durable over several tens of thousands of hours.

(C) The dyestuff does not form any solid particles, such as decomposed products, reaction products, or association products, when irradiated with the converging laser in a wavelength band capable of absorbing control light (or when the temperature is increased).

(D) The dyestuff does not cause any absorption of light or scattering of light in a wavelength band of signal light.

The following solvent-soluble phthalocyanine derivative can be preferably used as a dyestuff according to a wavelength band of the control light, when the signal light has a wavelength of 980 to 2000 nm.

650 to 670 nm: 1,5,9,13-tetra-tert-butyl copper phthalocyanine 685 to 715 nm: 1,5,9,13-tetra-tert-butyl oxyvanadium phthalocyanine 730 to 830 nm: 2,11,20,29-tetra-tert-butyl oxyvanadium naphthalocyanine 840 to 890 nm: 5,9,14,18,23,27,32,36-octa-n-butoxy-2,3-naphthalocyanine

[Solvent]

The solvent used for a thermal lens forming element according to the present invention is required to satisfy the following requirements.

[1] The dyestuff used for a thermal lens forming element according to the present invention is stably soluble at an appropriate concentration in the solvent.

[2] The solvent is durable against irradiation of a laser serving as signal light or control light for at least 2,000 hours or, if possible, durable over several tens of thousands of hours.

[3] The solvent is durable against a temperature rise exceeding 200° C. at a convergence position of a laser serving as signal light or control light for at least 2,000 hours or, if possible, durable over several tens of thousands of hours.

[4] The solvent does not form any solid particles, such as decomposed products, reaction products, or association products, when irradiated with a laser serving as signal light or control light (or when the temperature is increased).

[5] The solvent does not cause any absorption of light or scattering of light in a wavelength band of signal light.

[6] The solvent is sensitive to generation of heat or an increase in temperature caused by absorption of light at a convergence position of a laser serving as control light, and shows a change in refractive index not smaller than 0.0004 when the temperature changes by an amount of 1° C.

[Melting Point and Boiling Point of Solvent]

It is desirable that the thermal lens forming element has a wide operable temperature range, so that the thermal lens forming element can be widely used in various fields. For example, when used in the field of optical communications, the thermal lens forming element is required to operate without any trouble in the temperature range from −40° C. to 85° C. If the solvent has a melting point less that −40° C., the solvent can satisfy the above-described low temperature requirement.

To enable a thermal lens forming element to function sufficiently, if the temperature has already reached 85° C. in an off state of control light, it is required that the dyestuff solution is in a liquid state even when the temperature of a light source emitting the control light is increased to 200° C. or, if possible, over 300° C. More specifically, it is desirable that the solvent used for a thermal lens forming element according to the present invention has a boiling point not less than 200° C. or, if possible, over 300° C. The chemical constitution of the solvent is not limited to monomeric components and can be mixed components.

The mixed solvent including the following four structural isomer components (having the same molecular weight) is recommendable as a solvent for a thermal lens forming element according to the present invention.

first component: 1-phenyl-1-(2,5-xylyl)ethane
second component: 1-phenyl-1-(2,4-xylyl)ethane
third component: 1-phenyl-1-(3,4-xylyl)ethane
fourth component: 1-phenyl-1-(4-ethylphenyl)ethane Hereinafter, this solvent is referred to as "solvent #1."

Figure 6:
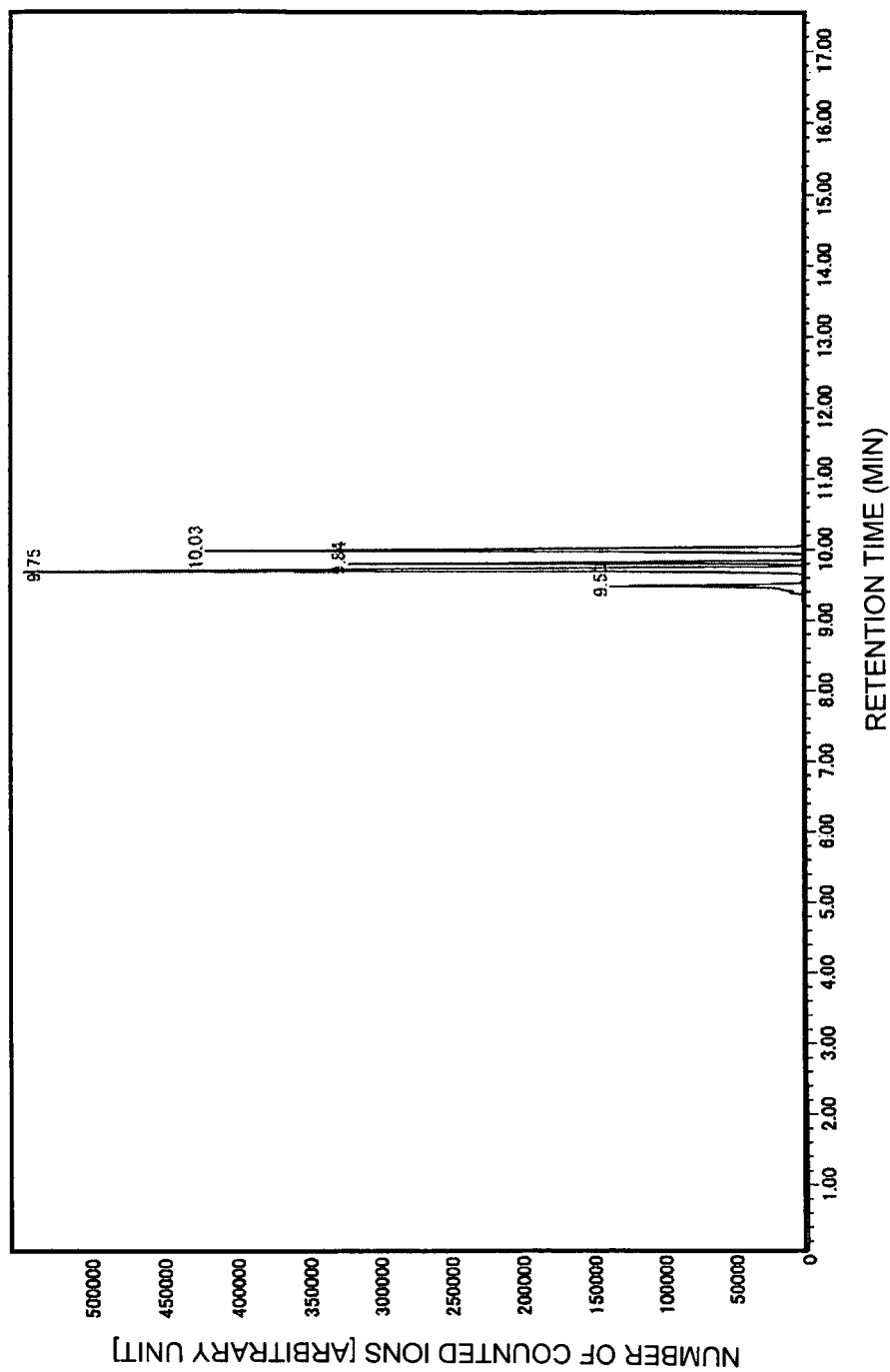
FIG. 6 is a mass spectrometric gas chromatogram of solvent #1 used for a thermal lens forming element according to the present invention.

FIG. 6 is a mass spectrometric gas chromatogram of the solvent #1. In any of four main peaks, the mass of a molecular ion peak is 210. It is apparent that the structural isomer components of the mixture are identical in molecular weight, although the relationship between respective peaks and the above-described chemical constitution is unknown.

The solvent #1 has the following physical properties.

The solvent #1 is a colorless and transparent liquid in its appearance.

The solvent #1 has weak aromatic odor.

The solvent #1 has a boiling point of 290 to 305° C.

The solvent #1 has a melting point of −47.5° C.

The solvent #1 has a vapor pressure of 0.067 Pa (25° C.).

The solvent #1 has a vapor density of 7.2 (air=1).

The solvent #1 has a specific gravity (water=1) of 0.987.

The solvent #1 is not soluble in the water at 20° C.

"Lion S" (manufactured by Lion Corporation), which is alkyl naphthalene oil usable for an oil diffusion pump, is usable as a solvent having a boiling point not less than 300° C. and enabling the phthalocyanine derivative to be soluble well. Hereinafter, this solvent is referred to as "solvent #2."

According to the ring beam system, a thermal lens forming element using the solvent #2 forms a ring beam smaller in size and slower in response speed compared to a thermal lens forming element using the solvent #1. According to the circular beam system, the thermal lens forming element using the solvent #2 forms a circular beam smaller in deflection angle and slow in response speed compared to the thermal lens forming element using the solvent #1.

The following test was conducted to evaluate the thermal lens effect variable depending on the type of a solvent.

[Measurement of Temperature Variation in Refractive Index]

Figure 7:
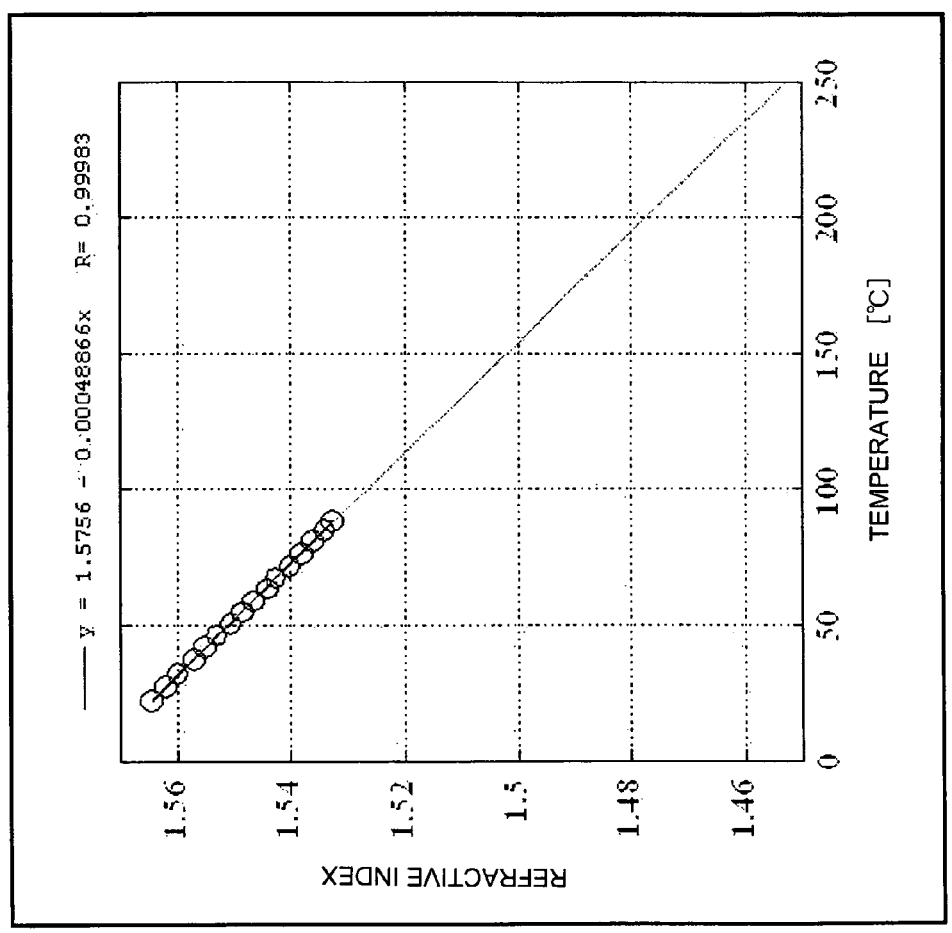
FIG. 7 is a graph illustrating temperature dependency of the refractive index of solvent #1 used for a thermal lens forming element according to the present invention.
Figure 8:
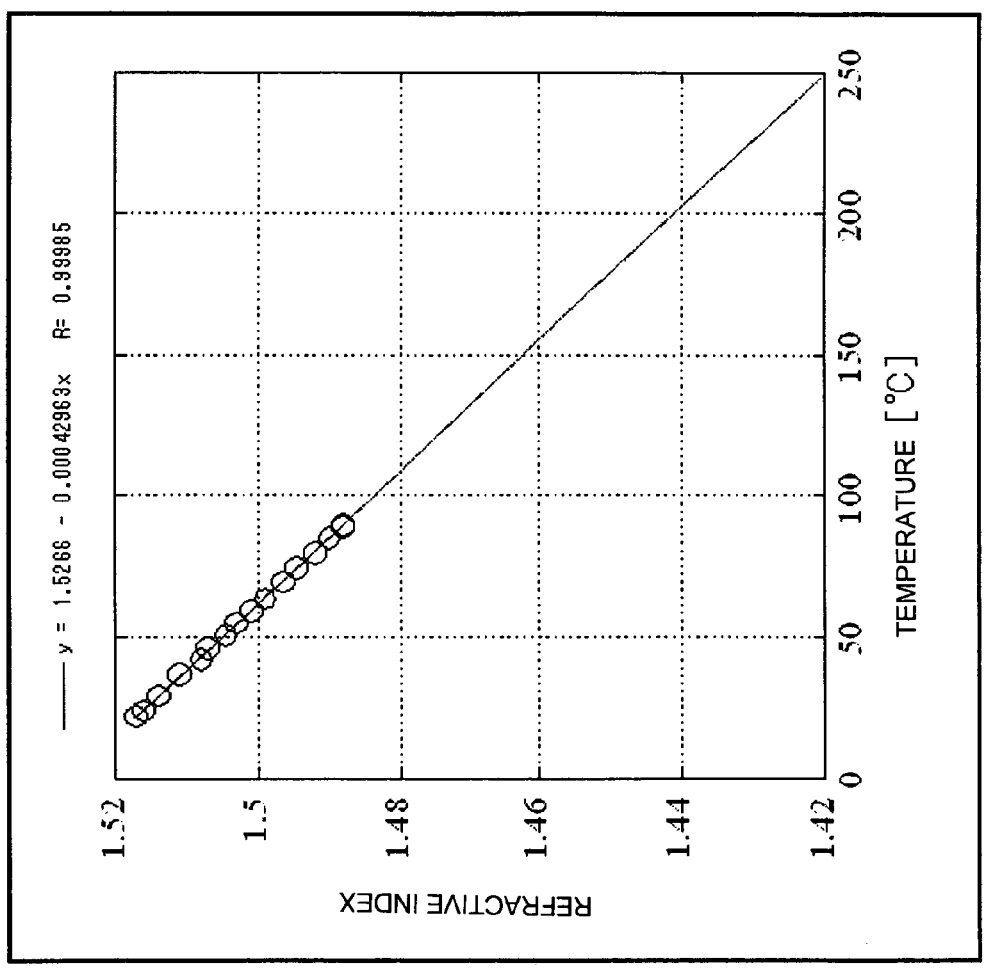
FIG. 8 is a graph illustrating temperature dependency of the refractive index of solvent #2 used for a comparative example.

The refractive index was measured at a plurality of temperature levels from 20° C. to 90° C., using a refractive index meter NAR-2T having a hot water circulating sample holder (manufactured by ATAGO CO., LTD.). FIG. 7 illustrates refractive index/temperature characteristics of solvent #1. FIG. 8 illustrates refractive index/temperature characteristics of solvent #2.

The observed temperature change in the refractive index is approximately linear and can be accurately extrapolated in a temperature range exceeding 200° C. The following is measured coefficients of temperature variation in the refractive index.

solvent #1: −0.00048866
solvent #2: −0.00042963

More specifically, the difference between the solvent #1 and the solvent #2 in the temperature change coefficient of the refractive index is small.

[Measurement of Temperature Variation in Viscosity]

According to the inventors of the present invention, a large difference was confirmed in the measurement of the temperature variation in the viscosity between the solvent #1 and the solvent #2.

The measurement of the temperature variation in the viscosity can be performed according to a method including the steps of placing a liquid sample in a measuring apparatus (e.g., a capillary viscometer or a Hoppler falling-ball viscometer), heating the entire body of the measuring apparatus, and starting a measurement when the temperature reaches a predetermined level, or according to another method including the steps of raising the temperature of the liquid sample only, inserting a rotary sensor or a tuning fork sensor in the liquid sample, and measuring the viscosity of the sample together with its temperature.

When the measurement temperature is raised up to 150° C. or more, it is not easy to perform measurement operations while uniformly heating the viscometer body. Therefore, a method for heating only the liquid sample during the measurement was adopted. According to a method including the step of inserting a rotary sensor in the liquid sample, it is difficult to accurately control the depth of the sensor and accurately measure the temperature of the sensor in a temperature increasing state. Therefore, a method including the steps of inserting a tuning fork sensor having a small heat capacity in a liquid sample, holding it at a constant depth, and measuring the viscosity of the sample based on a change in resonance frequency was employed.

As a measuring apparatus, a tuning fork vibration viscometer (e.g., A&D Sine-wave Vibro Viscometer SV-10 manufactured by A & D Company Limited) was used. After completing a correction using a JIS standard solution "viscosity 10" at the temperature around 25° C., variations in viscosity/temperature were measured. Considering the specification of the apparatus, the upper limit of the measurement temperature was set to 160° C. The amount of the liquid sample was set to 100 ml. The liquid sample was heated on a hot plate at a temperature increasing speed of 5° C./min, while it was slowly stirred by a magnetic stirrer associated with the hot plate.

The volume of the liquid sample expands according to an increase in temperature and the liquid surface rises accordingly. Hence, a sample container and the magnetic stirrer equipped hot plate were placed on a laboratory jack. The height of the sample container was adjusted so as to maintain a positional relationship between a tuning fork sensor of the viscometer and the liquid surface of the sample.

Figure 9:
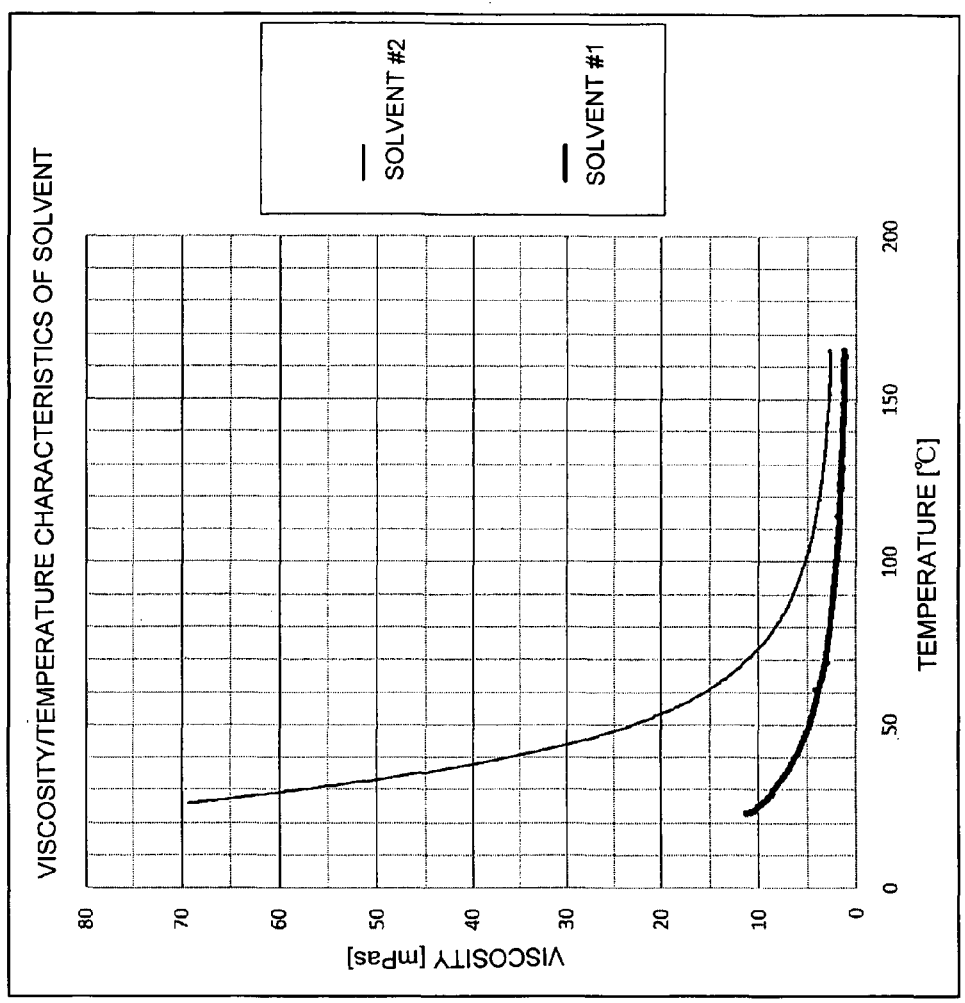
FIG. 9 is a graph illustrating viscosity/temperature characteristics of solvent #1 and solvent #2, in which a bold line indicates characteristics of the solvent #1 and a thin line indicates characteristics of solvent #2.

FIG. 9 illustrates viscosity/temperature characteristics of the solvent #1 and the solvent #2, which are measured according to the above-described method. As apparent from the characteristic curves of the solvent #1 and the solvent #2, the viscosity steeply decreases in a temperature range exceeding the room temperature and slowly decreases in a temperature range exceeds 100° C. When the temperature exceeds 150° C., the viscosity does not cause any substantial change in response to a change in temperature.

Furthermore, as understood from FIG. 9, the change in viscosity of the solvent #2 (thin curve) relative to a change in temperature is very large, compared to the solvent #1 (bold curve). A numerical value ($\eta 1/\eta 2$) is used to quantitatively express the difference in the viscosity/temperature characteristics, in which $\eta 1$ represents the viscosity at 40° C. (i.e., at the temperature slightly higher than the room temperature) and $\eta 2$ represents the viscosity at 160° C.

A numerical value obtained by dividing a viscosity value at 40° C. by a viscosity value at 100° C. is usable as a numerical value expressing viscosity/temperature characteristics of lubricating oil. When the temperature starts increasing from the room temperature during a measurement, the temperature increasing speed becomes moderate in a temperature range around 40° C. Therefore, 40° C. was selected as a representative temperature on the low-temperature side.

Considering the specification of the selected viscometer, the viscosity at 160° C. was designated as a representative value on the high-temperature side because the change in viscosity relative to a change in temperature becomes moderate in a temperature range exceeding 150° C. In other words, the designated representative value on the high-temperature side is meaningful as it relates to the thermal lens effect. Table 1 shows a result of measurement values, obtained by continuously conducting the measurement three times so as to reduce measurement errors.

TABLE 1

Comparison Between Solvent #1 And Solvent #2 In Viscosity/Temperature Characteristics

| SOLVENT | MEASUREMENT NUMBER | $\eta 1$ VISCOSITY (40° C.) [mPa·s] | $\eta 2$ VISCOSITY (160° C.) [mPa·s] | $\eta 1/\eta 2$ |
|---|---|---|---|---|
| #1 | 1 | 5.76 | 1.17 | 4.94 |
|  | 2 | 5.93 | 1.17 | 5.07 |
|  | 3 | 6.29 | 1.26 | 5.00 |
|  | AVERAGE | — | — | 5.00 |
| #2 | 1 | 36.15 | 2.57 | 14.06 |
|  | 2 | 34.45 | 2.53 | 13.63 |
|  | 3 | 36.38 | 2.69 | 13.52 |
|  | AVERAGE | — | — | 13.74 |

According to the solvent #1, an averaged ratio $\eta 1/\eta 2$ in the viscosity between 40° C. and 160° C. is 5.00. According to the solvent #2, the ratio $\eta 1/\eta 2$ is 13.7. It is considered that "thermal lens forming" processes have a significant influence on the above-described differences in the viscosity/temperature characteristics. More specifically, the heat generated at a convergence point of the control light (its size is in the order of several μm) increases the temperature of a dyestuff solution. The dyestuff solution thermally expands and the refractive index of the dyestuff solution decreases at the convergence point.

The solvent #1 has a relatively low viscosity at or near the room temperature and causes a small change in viscosity when the temperature is increased. Accordingly, it is estimated that "propagation of thermal expansion" (i.e., a phenomenon accompanied by migration of molecules and different from heat conduction) can be smoothly advanced in the process of heat transfer to a peripheral region, due to small viscosity (i.e., shear stress acting between solvent molecules).

On the other hand, the solvent #2 has a relatively higher viscosity at or near the room temperature and causes a large change in the viscosity when the temperature is increased. The "propagation of thermal expansion" is blocked by a large shear stress caused by neighboring "solvent molecules in a low-temperature state." Therefore, the "propagation of thermal expansion" occurs only when the ordinary "heat conduction" increases the temperature of neighboring molecules (more specifically, increase vibration of molecules) and accordingly decreases the viscosity. Reduction in refractive index caused by an increase in temperature greatly depends on "a volume expansion=a decrease in density." As a result, it is considered that the propagation of such a volume expansion region is fast in the solvent #1 and slow in the solvent #2.

Accordingly, a refractive index reduction region (=thermal lens effect region) is widen smoothly in the solvent #1.

Considering the foregoing, viscosity/temperature characteristics of various solvents were measured and compared to evaluate differences in thermal lens effect and response speed. As a result, it was confirmed that temperature/viscosity characteristics of an excellent solvent for a dyestuff solution usable in a thermal lens forming element satisfy the conditions that the viscosity at 160° C. or above is 0 to 3 mPa·s and the ratio η1/η2 is not less than 1 and not greater than 6, where η2 represents a viscosity of the solvent at 160° C. and n1 represents a viscosity of the solvent at 40° C.

A solvent preferably used at the temperature of 160° C. or above has a viscosity equal to or less than 3 mPa·s and not less than 0 mPa·s. If the viscosity exceeds 3 mPa·s at 160° C. or above, thermal lens formation characteristics are further lessened and the response speed is decreased, compared to the solvent #2. Thus, a thermal lens forming element cannot operate properly. An upper limit of the ratio η1/η2, obtained by dividing the viscosity η1 at 40° C. by the viscosity η2 at 160° C., is 6, which is an upper limit value of a solvent comparable in thermal lens effect and response speed to the solvent #1. If the ratio η1/η2 exceeds the upper limit value, an optical path changing angle caused by thermal lens effect becomes smaller and the response speed decreases, compared to the solvent #1 if the control light power is maintained at the same level. A lower limit of the ratio η1/η2 is larger than 1.

Usable solvents are limited to specific types if required to satisfy the above-described requirements [1] to [6] and the condition that the boiling point is 200° C. or above and the melting point is −40° C. or below, in addition to fulfillment of the above-described viscosity/temperature characteristics. More specifically, the above-described mixed solvent "solvent #1" (having compositions illustrated in FIG. 6) and derivative solvents having modified compositions can be preferably used.

[Inert Gas]

The thermal lens forming element 1 illustrated in FIG. 1 includes the first chamber 11 and the second chamber 13, which are provided in the optical cell 16 and filled with a solution containing at least one dyestuff dissolved in a solvent. The lid 15 is bonded to an open end of the optical cell 16. The first chamber 11 is connected to the second chamber 13 via the solution channel 12, which is defined by the dam 17. The bubble 14 of an inert gas is confined together with the dyestuff solution in the second chamber 13. The bubble 14 has the role of absorbing an increase/decrease in the internal pressure of the optical cell 16, which is caused by thermal expansions of the optical cell 16 and the dyestuff solution when the temperature of the thermal lens forming element 1 is raised or lowered. The optical cell 16 is made of quartz glass or sapphire glass. Therefore, a thermal expansion occurring in a temperature range from the room temperature to 300° C. is extremely small.

On the other hand, the solvent stored in the optical cell 16 (especially, an organic solvent) causes a large thermal expansion. In general, the pressure required to compress a liquid is very large. If a solvent is confined in a glass cell without adding any bubble, the glass cell will be broken when the solvent expands or shrinks according to a change in temperature (even if the temperature changes in the range of ±10° C. to ±20° C.). To prevent the glass cell from being broken, it is effective to add an inert gas to an inner space of the glass cell. Therefore, the bubble 14 is confined together with the dyestuff solution in a closed space of the thermal lens forming element 1, i.e., the first chamber 11 through which the signal light travels, the solution channel 12 narrowed by the dam 17, and the second chamber 13. The solution channel 12, narrowed by the dam 17, can prevent the bubble 14 from entering the first chamber 11. Thus, the bubble 14 does not adversely influence the signal light.

The type of a preferable inert gas is, for example, helium, nitrogen, argon, or xenon. It is desired that an inert gas volume (i.e., charged amount) of the bubble 14 is 2 to 5% of a total volume of the first chamber 11, the solution channel 12 and the second chamber 13, which are formed in the optical cell 16 of the thermal lens forming element 1, when the temperature of the inert gas is 30° C. and the pressure of the inert gas is 1013 hPa. It can be experimentally confirmed that the thermal lens forming element 1 satisfying the above-described volume condition is usable without causing any problem even if the ambient temperature is 85° C.

[Application of Thermal Lens Forming Element to Ring Beam System Optical Path Switching Apparatus]

Figure 4:
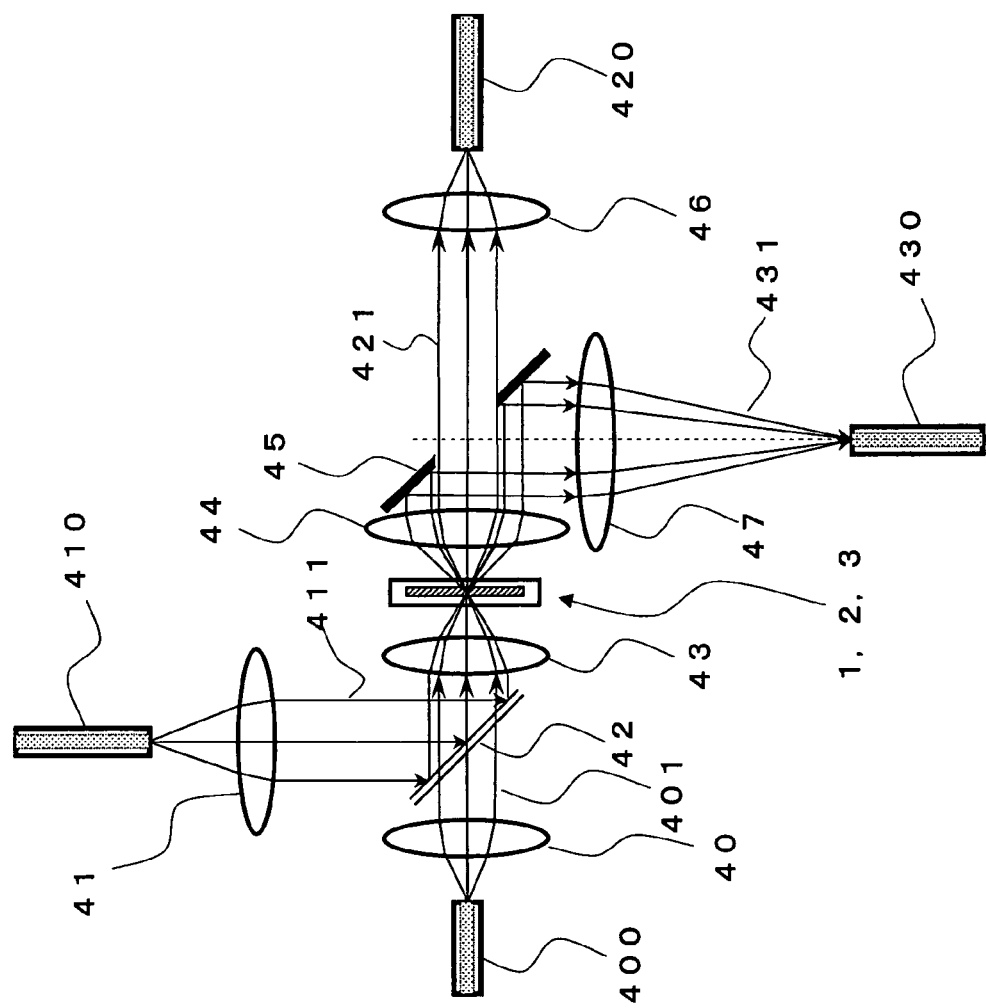
FIG. 4 illustrates a schematic arrangement of an example of an optical path switching apparatus including a thermal lens forming element according to the present invention.

FIG. 4 illustrates a schematic arrangement of an example of a ring beam system optical path switching apparatus including a thermal lens forming element according to the present invention. A detailed arrangement of the ring beam system optical path switching apparatus is described in patent literature 1. Signal light from an optical fiber 400 enters a collimating lens 40 and is converted into a parallel beam 401. The parallel beam 401 passes through a dichroic mirror 42 and reaches a collective lens 43. Convergent light, converged by the collective lens 43, is incident on the thermal lens forming element 1 (or a thermal lens forming element 2 or 3 which is described below).

Control light from an optical fiber 410 enters a collimating lens 41 and is converted into a parallel beam 411. The parallel beam 411 is reflected by the dichroic mirror 42 and travels as a beam with an optical axis identical to the optical axis of the signal light beam 401. Then, the control light is converged by the collective lens 43 and is incident as convergent light on the thermal lens forming element 1 (or the thermal lens forming element 2 or 3).

According to the ring beam system optical path switching apparatus and its method, fine adjustment of the optical system is performed in the following manner. Both the control light and the signal light, having the same optical axis, are converged and incident on the control light absorbing region of the thermal lens forming element. Furthermore, convergence regions of the control light and the signal light are overlapped with each other and are positioned near the signal light entering side of the control light absorbing region.

The control light converged and incident on the signal light entering side of the control light absorbing region of the thermal lens forming element is absorbed by the control light absorbing region while it travels. The energy of absorbed light changes into heat, which causes a reduction in density and in refractive index of a dyestuff solution due to a thermal expansion. Thus, a thermal lens having a specific shape is formed in the light traveling direction. The signal light, which is converged and incident on the thermal lens thus formed in the control light absorbing region, travels while it spreads.

The signal light, having a Gaussian distribution when it enters the thermal lens, is converted into a beam having a ring-shaped energy distribution in its cross section. Thus, the signal light is output from the thermal lens forming element 1 (or the later-described thermal lens forming element 2 or 3) with a large divergence angle which cannot be obtained when the thermal lens forming element is not irradiated with the control light.

The output signal light enters the light-receiving lens 44 having a numerical aperture larger than that of the collective lens 43. The signal light, which is converted into a parallel beam, is incident on a holed mirror 45. The holed mirror 45 is inclined at an angle of 45 degrees relative to the optical path of the signal light which is progressive (i.e., under no irradiation of the control light). The holed mirror 45 allows the progressive beam of the signal light to pass through its hole.

When the control light is not emitted from the optical fiber 410, the signal light travels straight and reaches a coupling lens 46 as signal light 421. The signal light 421 is then converged by the coupling lens 46 and can reach an optical fiber 420. On the other hand, if the control light is emitted from the optical fiber 410, the signal light is convergently deformed into a ring beam due to thermal lens effect and therefore reflected by the holed mirror 45 (more specifically, by a peripheral region around the hole). The reflected signal light enters a coupling lens 47, in which the signal light is converged as optical path switched signal light 431. Then, the optical path switched signal light 431 reaches an optical fiber 430.

FIG. 10a to FIG. 10d illustrate cross-sectional beam configurations of signal light output from the thermal lens forming element 1 (optical path length=500 μm) in relation to control light power, under the following conditions. The thermal lens forming element 1 is filled with a solution containing 1,5,9,13-tetra-tert-butyl copper phthalocyanine (as a dyestuff) dissolved in the solvent #1 at the concentration of 0.2 weight %. A laser emitted from a signal light source has a wavelength of 1550 nm. A laser emitted from a control light source has a wavelength of 660 nm.

Figure 10A:
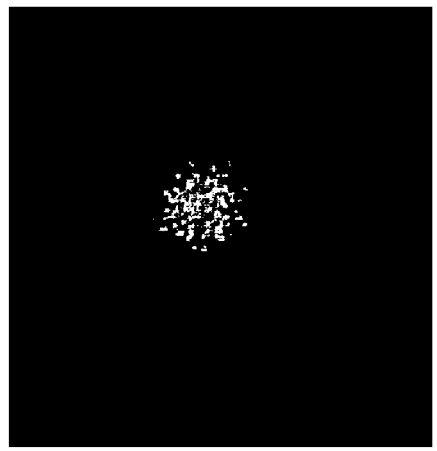
FIG. 10a illustrates a cross-sectional beam configuration of signal light output from a thermal lens forming element according to the present invention in relation to control light power, which is a cross-sectional view of the signal light (circular beam having a Gaussian distribution) observed when the thermal lens forming element is not irradiated with control light.
Figure 10B:
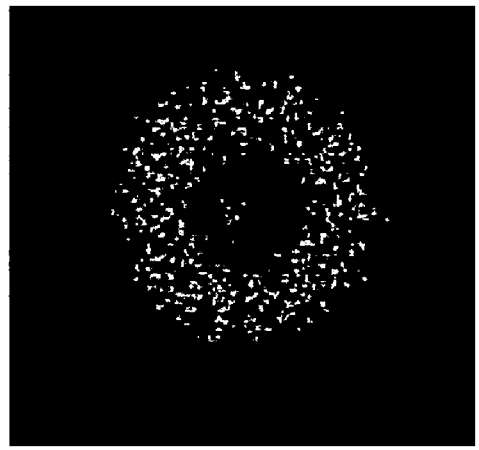
FIG. 10b illustrates a cross-sectional beam configuration of signal light output from a thermal lens forming element according to the present invention in relation to control light power, which is a cross-sectional view of the signal light observed when the thermal lens forming element is irradiated with control light having a power of 2.2 mW.
Figure 10C:
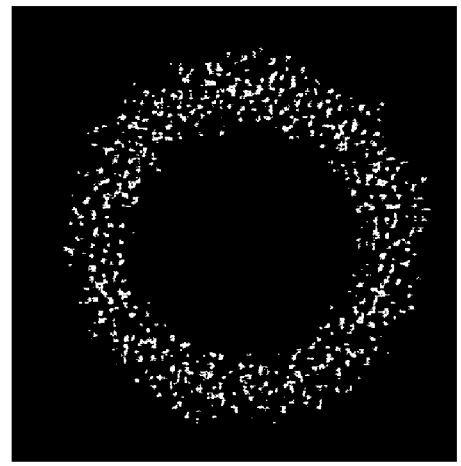
FIG. 10c illustrates a cross-sectional beam configuration of signal light output from a thermal lens forming element according to the present invention in relation to control light power, which is a cross-sectional view of the signal light observed when the thermal lens forming element is irradiated with control light having a power of 4.3 mW.
Figure 10D:
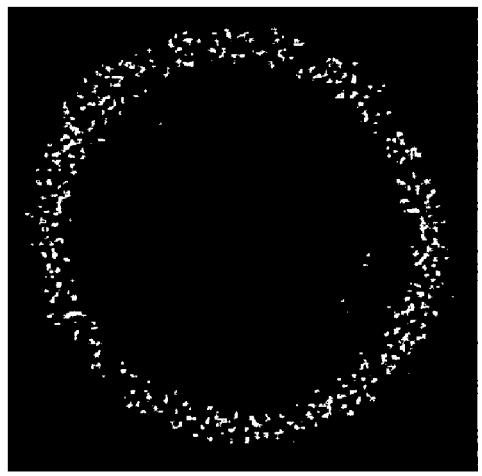
FIG. 10d illustrates a cross-sectional beam configuration of signal light output from a thermal lens forming element according to the present invention in relation to control light power, which is a cross-sectional view of the signal light observed when the thermal lens forming element is irradiated with control light having a power of 7.6 mW.

When no control light is emitted, the signal light becomes a beam having a circular-shape in its cross section and having a Gaussian distribution in energy, as illustrated in FIG. 10a. If the control light power is increased stepwise to 2.2 mW, 4.3 mW, and 7.6 mW, the beam cross section of the signal light changes as illustrated in FIGS. 10b, 10c, and 10d. According to the results illustrated in FIGS. 10a to 10d, the ring can be optimized in shape and size when the control light power is 4.3 mW. When the control light power is 2.2 mw, the "divergence angle of the ring" is insufficient. When the control light power is 7.6 mW, the shape of the thermal lens collapses due to strong control light and therefore multiple rings are formed.

The ring beam system optical path switching apparatus using a thermal lens forming element according to the present invention can perform conversion between a circular beam having a Gaussian distribution under no irradiation of control light and a ring beam under control light irradiation, with a small control light power of 4 to 5 mW.

The response speed of the ring beam system optical path switching apparatus using a thermal lens forming element according to the present invention was evaluated in the following manner. The control light power was changed in its frequency using a duty ratio of 1:1 (i.e., control light source on-time/off-time ratio=1:1) so as to be intermittent. A corresponding change in intensity of progressive control light was observed as a waveform on an oscilloscope screen.

Figure 11:
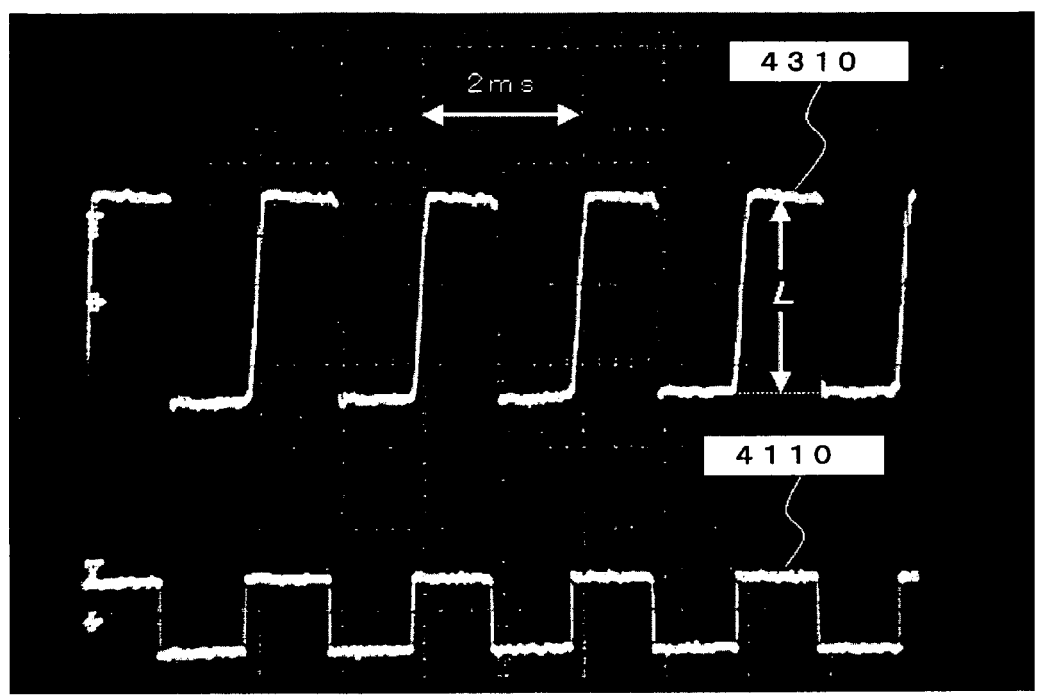
FIG. 11 illustrates waveforms of control light and signal light displayed on an oscilloscope.
Figure 12:
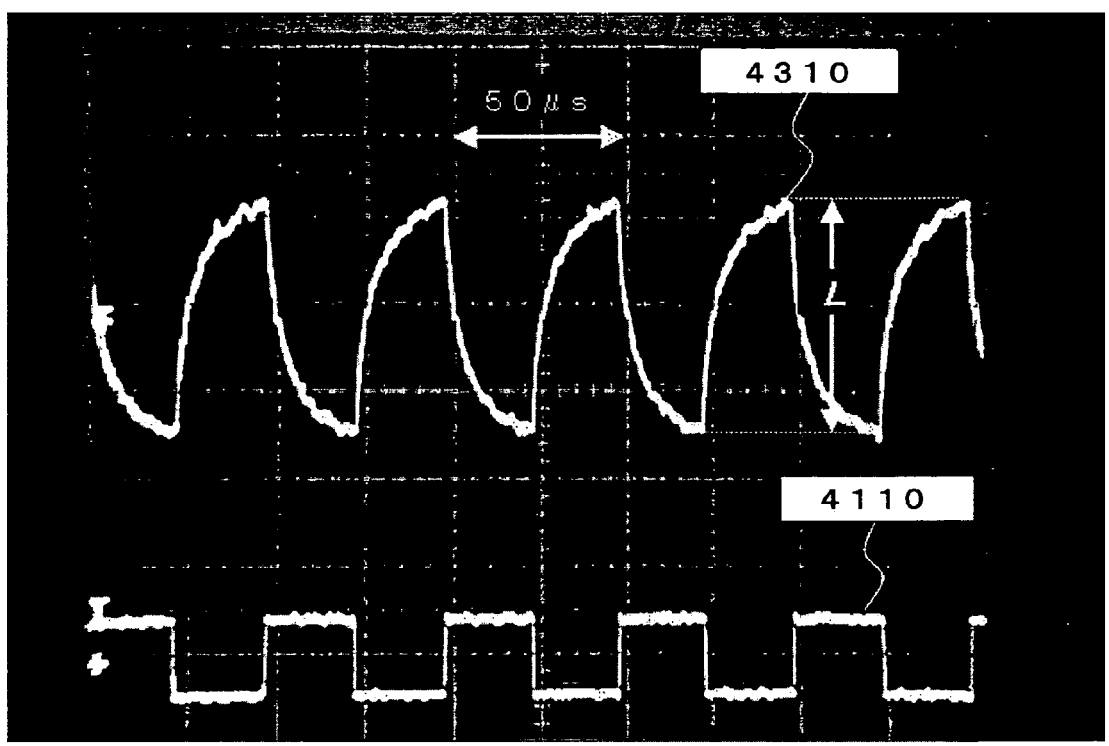
FIG. 12 illustrates waveforms of control light and signal light displayed on an oscilloscope.

In FIG. 4, part of the control light 411 incident on the thermal lens forming element 1 (or the later-described thermal lens forming element 2 or 3) can be guided to a photodetector and measured on the oscilloscope screen. In response to on/off of the control light 411, the optical path switched signal light 431 can be guided to a photodetector and measured on the oscilloscope screen. FIGS. 11 and 12 illustrate a waveform 4110 of control light and a waveform 4310 of signal light, which were measured in this manner and observed on the oscilloscope screen.

Figure 13:
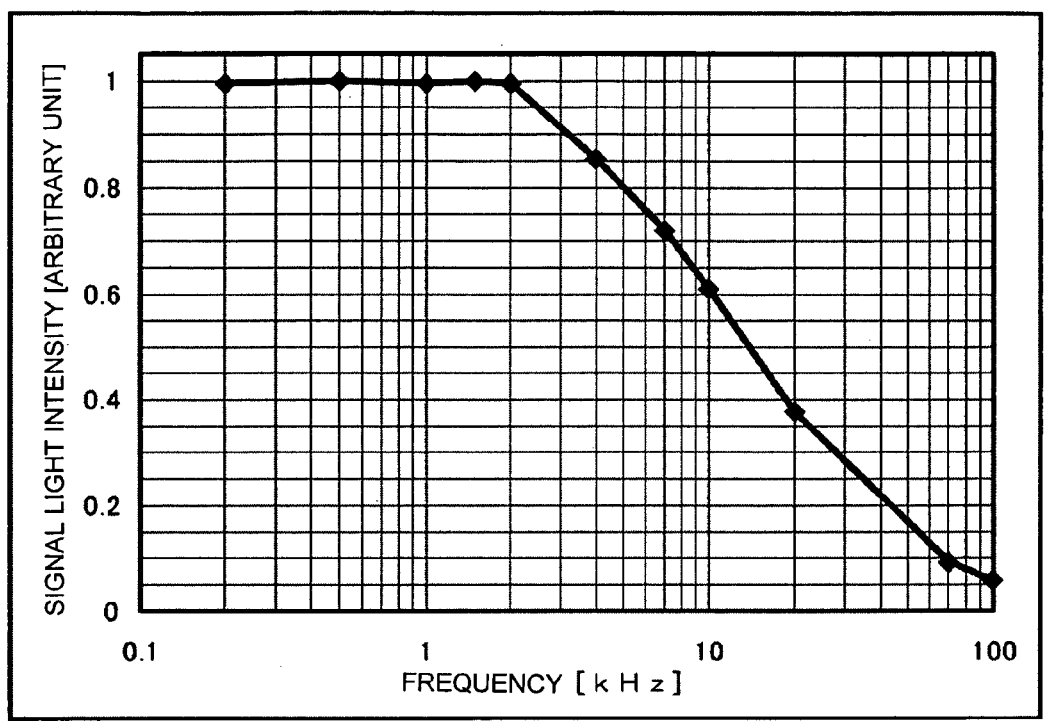
FIG. 13 is a graph illustrating a relationship between control light on/off frequency and intensity (amplitude) of optical path switched signal light.

FIG. 12 has an ordinate axis whose scale is enlarged three times compared to the scale of FIG. 11. FIG. 13 illustrates an amplitude L of the waveform 4310 of the optical path switched signal light 431 corresponding to the on/off of the control light 411, measured when the frequency of a control light turning on/off rectangular wave was set to 0.1 kHz to 100 kHz.

In FIG. 11, the control light turning on/off rectangular wave has a frequency of 500 Hz. The amplitude L of the waveform 4310 of the signal light corresponding to the on/off of the signal light was defined as a reference value (=1). The amplitude L was maintained at 1 in the frequency range of 0.2 to 2 kHz of the control light turning on/off rectangular wave. More specifically, the switching of the optical path was perfectly realized at the response speed of 250 μsec.

FIG. 12 illustrates the waveform 4310 of the signal light at the frequency of 20 kHz, as an example measured when the frequency is increased. As understood from FIG. 12, if the control light is turned off before completing the switching of the optical path caused by thermal lens effect, the signal light has a saw-tooth waveform and the amplitude L is small.

More specifically, the switching of the optical path becomes incomplete in a region exceeding the response speed in thermal lens effect. In other words, part of the signal light is not subjected to the switching of the optical path and travels straight. If the frequency of the control light turning on/off rectangular wave becomes higher than 2 kHz, the amplitude L of the signal light starts gradually decreasing as illustrated in FIG. 13.

To evaluate the optical path switching apparatus illustrated in FIG. 4, an endurance test was conducted. The signal light used in the test was continuous wave light. The control light having a frequency of 1 kHz was emitted as a rectangular wave beam turned on/off at a duty ratio of 1:1. As a result of the measurement, deterioration in intensity amplitude of the optical path switched signal light was not confirmed even after elapse of 10,000 hours.

Comparative Embodiment 1

Figure 14:
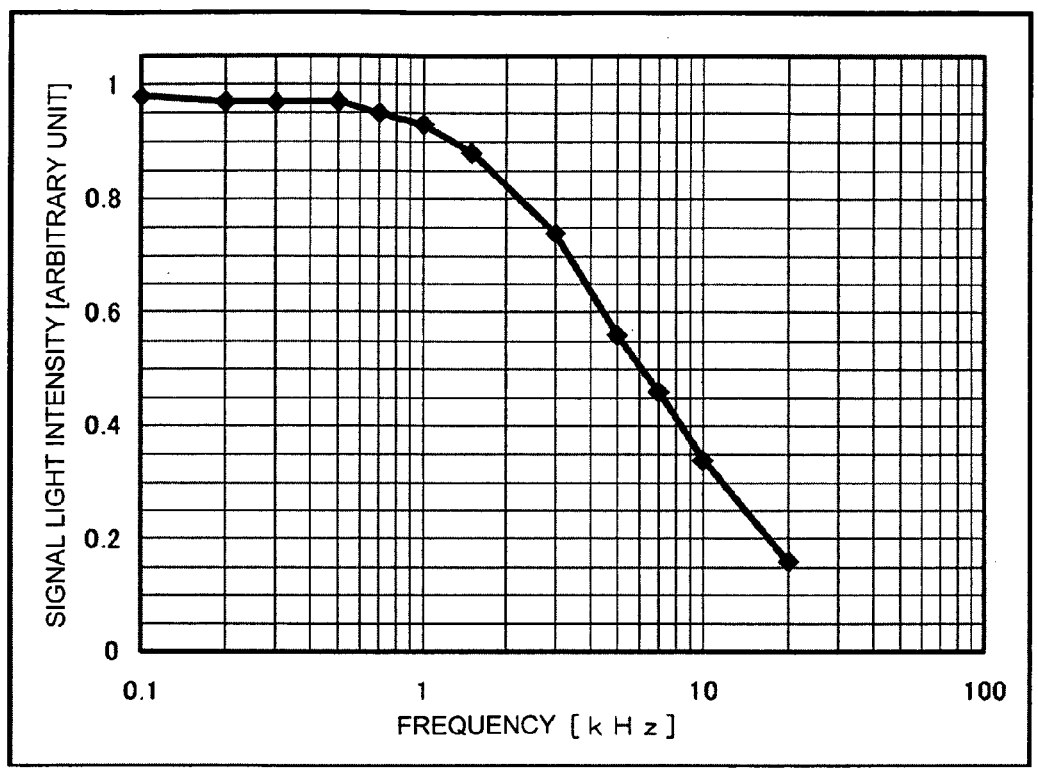
FIG. 14 is a graph illustrating a relationship between control light on/off frequency and intensity (amplitude) of optical path switched signal light.

FIG. 14 illustrates an amplitude L of the waveform 4310 of the optical path switched signal light 431 corresponding to the on/off of the control light 411, measured in a ring beam system optical path switching apparatus using the thermal lens forming element illustrated in FIG. 4, when the frequency of the control light turning on/off rectangular wave was set to 0.1 kHz to 20 kHz, although the solvent #2 is used instead of using the solvent #1. When the control light turning on/off rectangular wave has a frequency of 20 Hz (response speed=25 msec) (not illustrated), the amplitude L of the signal light is 1. However, when the frequency is set to 200 to 500 Hz (response speed=2.5 to 1 msec), the amplitude L of the signal light decreases to 0.97.

Furthermore, the amplitude L of the signal light gradually decreases according to an increase in frequency, as illustrated in FIG. 14. In short, the response speed of the thermal lens forming element decreases to ¼ if the solvent #1 is replaced with the solvent #2. This is because, as described above, the viscosity of the solvent #2 does not decrease so much when the temperature rises. Expansion of a low-density/low-refractive index region caused by a temperature rise in a signal light converging/absorbing portion can be prevented. Therefore, it can be estimated that a relatively long time is required to form a thermal lens.

[Application of Thermal Lens Forming Element to Circular Beam System Optical Path Deflecting Apparatus]

Figure 5:
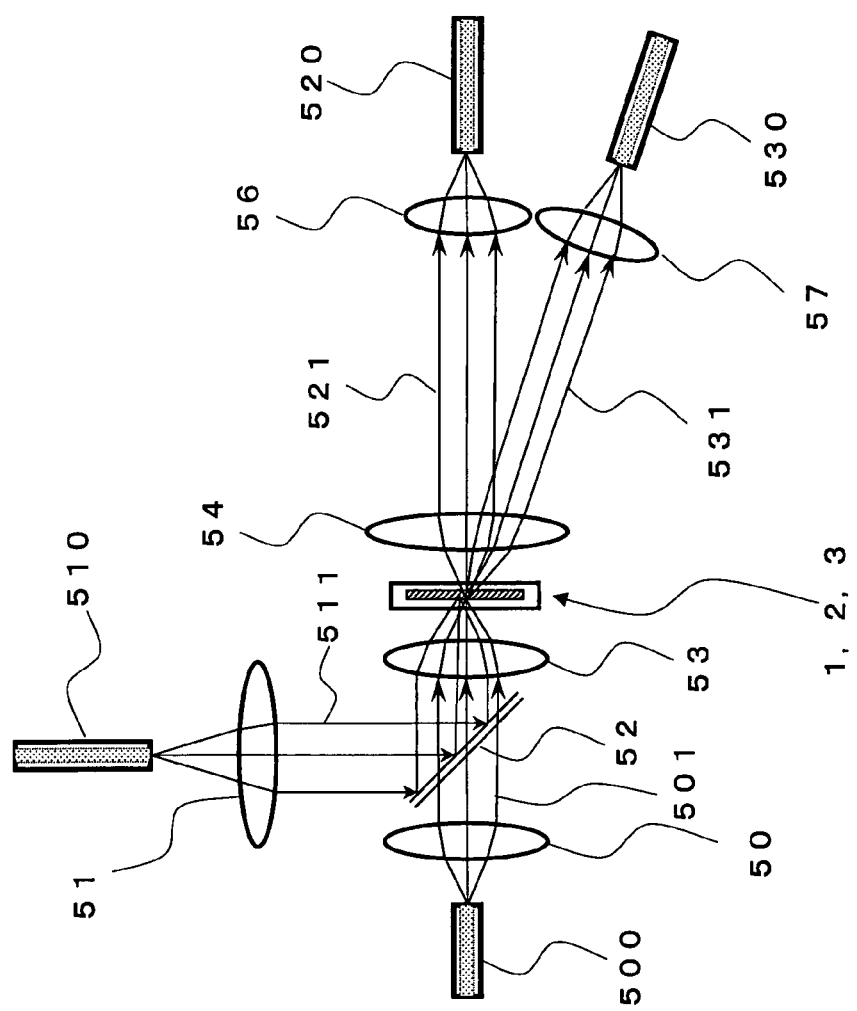
FIG. 5 illustrates a schematic arrangement of an example of an optical path deflecting apparatus including a thermal lens forming element according to the present invention.

FIG. 5 illustrates a schematic arrangement of an example of a circular beam system optical path deflecting apparatus including the thermal lens forming element 1 (or later-described thermal lens forming element 2 or 3) according to the present invention. Details of the circular beam system optical path deflecting apparatus are described in patent literatures 3 to 5. Signal light from an optical fiber 500 enters a collimating lens 50 and is converted into a parallel beam 501. The parallel beam 501 passes through a dichroic mirror 52 and reaches a collective lens 53. Convergent light, converged by the collective lens 53, is incident on the thermal lens forming element 1 (or the later-described thermal lens forming element 2 or 3).

Control light from an optical fiber 510 enters a collimating lens 51 and is converted into a parallel beam 511. The parallel beam 511 is reflected by the dichroic mirror 52 and travels as a beam parallel to the signal light beam 501. The parallel beam (control light beam) 511 has an optical axis offset by an amount of 30 μm from the optical axis of the signal light beam 501. Then, the control light is converged by the collective lens 53 and is incident as convergent light on the thermal lens forming element 1 (or the later-described thermal lens forming element 2 or 3).

According to the circular beam system optical path deflecting apparatus and its method, fine adjustment of the optical system is performed in the following manner. Both the control light and the signal light are converged and incident on the control light absorbing region of the thermal lens forming element. Furthermore, convergence regions of the control light and the signal light are partly overlapped with each other, by an offset of approximately 30 μm between centers thereof, and are positioned near the signal light entering side of the control light absorbing region.

The control light converged at a slightly offset position and incident on the signal light entering side of the control light absorbing region of the thermal lens forming element is absorbed by the control light absorbing region while it travels. The energy of absorbed light changes into heat, which causes reduction in density and in refractive index of a dyestuff solution due to thermal expansion. Thus, a thermal lens having a specific shape is formed in the light traveling direction. The signal light, which is converged at a different convergence position and incident on the thermal lens thus formed in the control light absorbing region, travels while it spreads. The signal light, having a Gaussian distribution when it enters the thermal lens, is converted into a beam having a circular-shaped energy distribution in its cross section. The signal light deflects (changes its traveling direction). Thus, the signal light is output from the thermal lens forming element 1 (or the later-described thermal lens forming element 2 or 3) with a deflection angle of several degrees relative to a progressive direction of the signal light when the thermal lens forming element is not irradiated with the control light.

The output signal light is received by a light-receiving lens 54 and is converted into a parallel beam. When the control light is not emitted from the optical fiber 510, the signal light travels straight and enters a coupling lens 56 as signal light 521. The signal light 521 is then converged by the coupling lens 56 and can reach an optical fiber 520. On the other hand, if the control light is emitted from the optical fiber 510, the signal light reaches a coupling lens 57 as signal light 531, which is deflected by thermal lens effect while it holds a circular beam shape. Then, the signal light converted by the coupling lens 57 enters an optical fiber 530.

Adjustment of the optical system was performed in the following manner. A signal light source emitting a laser having a wavelength of 1550 nm and a control light source emitting a laser having a wavelength of 860 nm were used. The thermal lens forming element 1 (optical path length=500 μm) according to the present invention was filled with a solution containing 5,9,14,18,23,27,32,36-octa-n-butoxy-2,3-naphthalocyanine (as a dyestuff) dissolved in the solvent #1 at the concentration of 0.1 weight %. The thermal lens forming element 1 was incorporated into the circular beam system optical path deflecting apparatus illustrated in FIG. 5.

Figure 15:
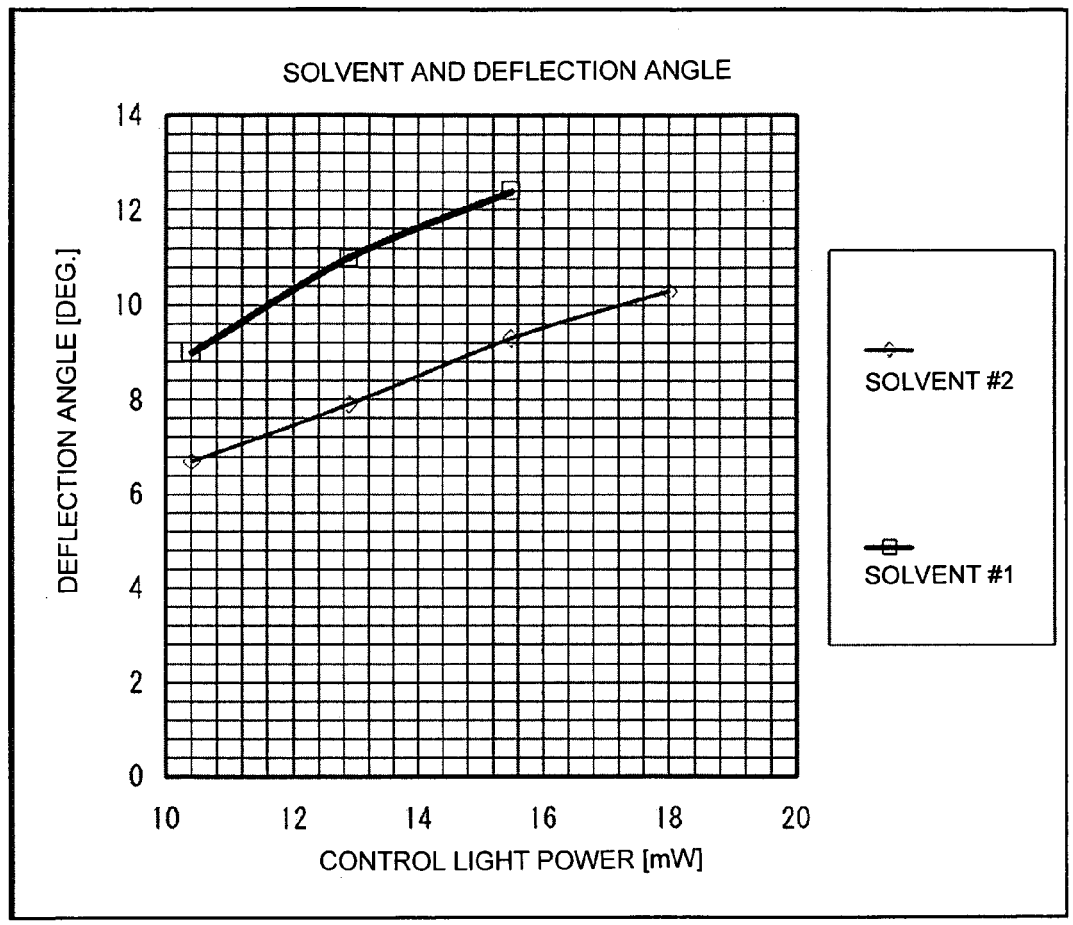
FIG. 15 illustrates a relationship between deflection angle and control light power in a circular beam system optical path deflecting apparatus, which employs a thermal lens forming element according to the present invention or a comparative example.

FIG. 15 illustrates a measurement result of the deflection angle of the signal light 531 deflected by thermal lens effect as a circular beam, when the control light power is changed stepwise to 10.4, 12.9, and 15.5 mW. The origin of the graph illustrated in FIG. 15 accords with a point where the signal light is output from the thermal lens forming element 1 when the control light is not emitted. The deflection angle "0" represents the output direction of the signal light when the control light is not emitted. The deflection angle increases to 9.0° (deg.), 11.0° (deg.), and 12.4° (deg.) with increasing control light power.

Comparative Embodiment 2

A signal light source emitting a laser having a wavelength of 1550 nm and a control light source emitting a laser having a wavelength of 860 nm were used. The thermal lens forming element 1 was filled with a solution containing 5,9,14,18,23,27,32,36-octa-n-butoxy-2,3-naphthalocyanine (as a dyestuff) dissolved in the solvent #2 at the concentration of 0.1 weight %. When the control light power is changed stepwise to 10.4, 12.9, 15.5, and 18.0 mW, the deflection angle of the signal light 531 deflected by thermal lens effect as a circular beam has changed to 6.7° (deg.), 7.9° (deg.), 9.3° (deg.), and 10.3° (deg.), respectively, as illustrated in FIG. 15. These deflection angles are apparently smaller than those of the thermal lens forming element 1 using the solvent #1. It can be estimated that the difference of the solvent influences the size of the thermal lens (i.e., thermal lens effect induced by the thermal lens forming element 1 continuously irradiated with the same control light power).

Second Embodiment

Figure 2A:
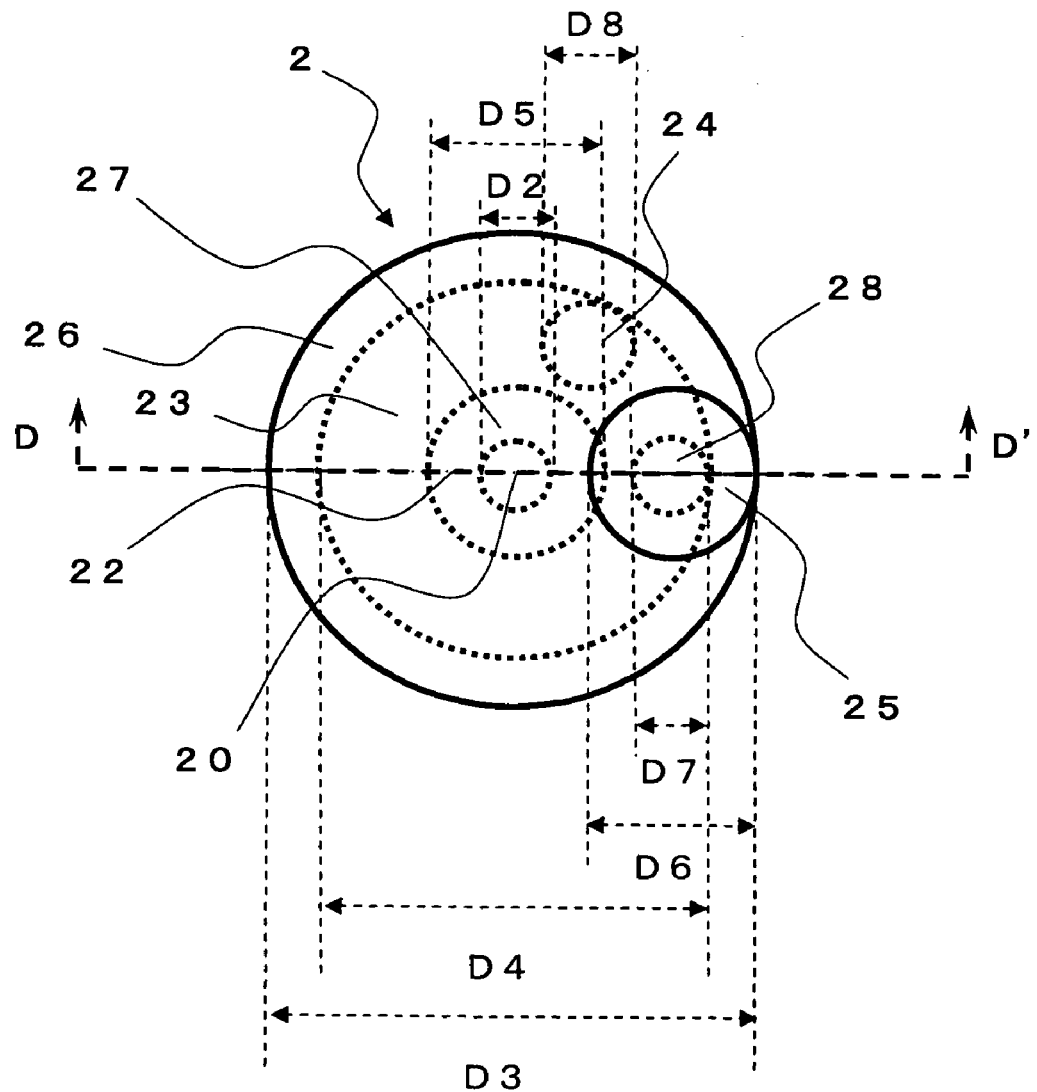
FIG. 2a illustrates a schematic arrangement of a thermal lens forming element according to a second embodiment of the present invention.
Figure 2B:
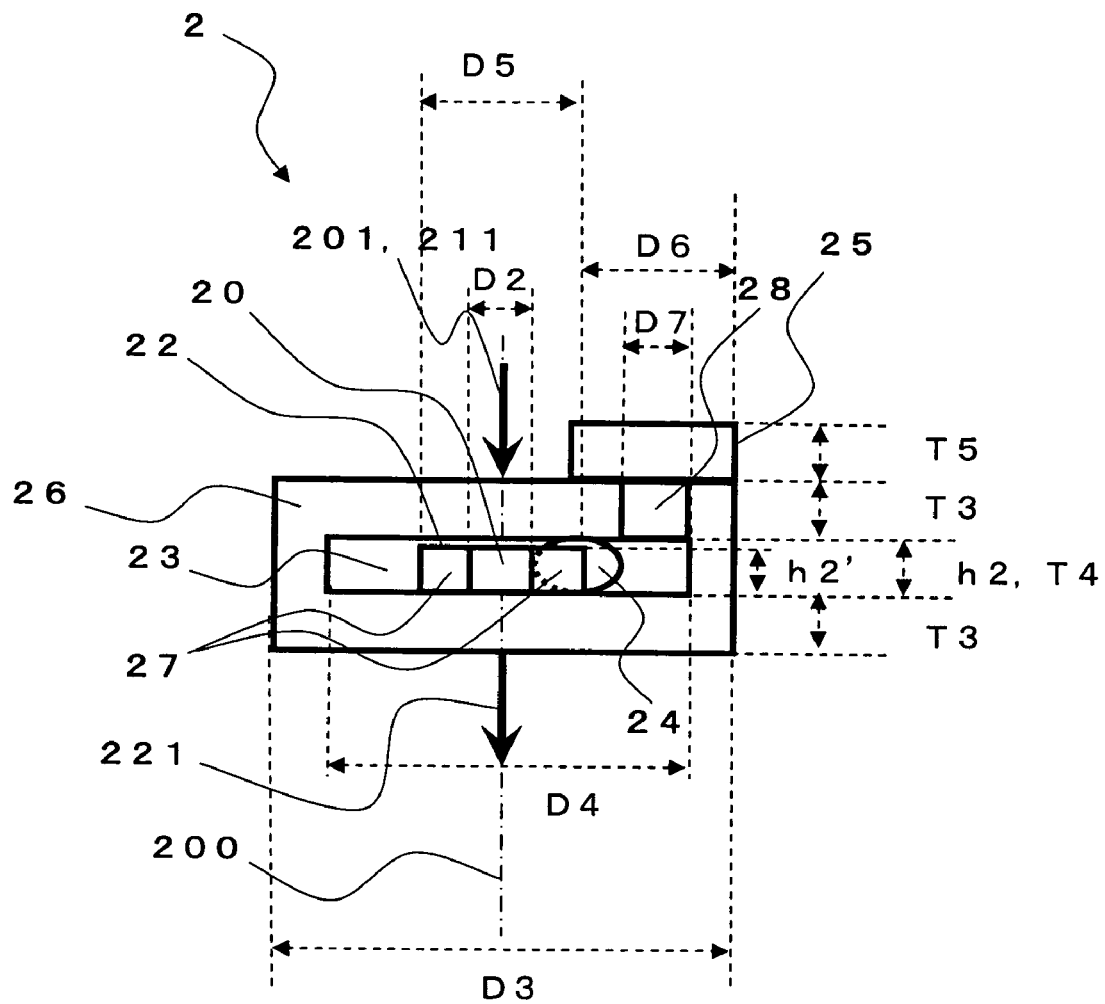

FIGS. 2a and 2b illustrate schematic arrangements of a thermal lens forming element 2 according to a second embodiment of the present invention.

[Arrangement of Thermal Lens Forming Element]

The thermal lens forming element 2 includes a first chamber 20 and a second chamber 23, which are formed in a coin-shaped optical cell 26 and filled with a solution containing a dyestuff dissolved in a solvent. The optical cell 26 has an aperture closed by a lid 25. A dam 27, having a ring-shaped body and provided between the first chamber 20 and the second chamber 23, defines a solution channel 22 that connects the first chamber 20 and the second chamber 23. As described below in detail, a bubble 24 (inert gas) is confined in the second chamber 23. Hereinafter, individual constituent components are described in detail.

[Optical Cell and Lid]

The coin-shaped optical cell 26 and the lid 25 are similar, in material, thickness of plate member, and applied non-reflective coating, to the optical cell 16 and the lid 15 described in the first embodiment. It is preferable that the shape of the first chamber 20 in the coin-shaped optical cell 26 is a symmetric shape, such as a square pole, a pentagonal prism, or a hexagonal column, which circumscribes a columnar body 20 whose central axis coincides with an optical axis 200 of incident signal light 201. Considering easiness in machining, an optimum shape of the first chamber 20 is a columnar body as illustrated in FIGS. 2a and 2b. Furthermore, it is desirable that the shape of the first chamber 20 accords with a diameter D2 and a height h2 of the columnar body 20.

The first chamber 20 having the above-described shape is filled with a dyestuff solution to constitute a control light absorbing region. The signal light 201 and control light 211 are incident on one bottom surface of the columnar body 20 and output from the other bottom surface. In this manner, when the shape of the control light absorbing region is symmetrical, a uniform thermal lens is formed in the control light absorbing region. More specifically, a situation where a high-temperature/low-density region causes a convective movement in the gravity field constantly occurs regardless of the gravity direction of the optical cell 26. Thus, substantially uniform thermal lens effect can be obtained regardless of the gravity direction of the thermal lens forming element 2.

Furthermore, in the disappearing process of the thermal lens formed in the control light absorbing region in response to on/off control of the control light, the dyestuff solution in the columnar body 20 can be efficiently cooled down because the dyestuff solution is completely surrounded by the glass material having a higher thermal conductivity. As a result, the thermal lens can speedily respond to the on/off control of the control light.

As described in the first embodiment, to effectively form a thermal lens in the control light absorbing region, it is required that a significant amount of thermal energy is stored in a specific region. To compare the intensity of control light with the magnitude of thermal lens effect, the diameter D2 of the columnar body 20 was set to 500 μm (i.e., a constant value) and the height h2 of the columnar body 20, i.e., the thickness of the dyestuff solution (optical path length) was changed to 25, 50, 100, 200, 500, and 1000 μm. The control light was, for example, set to have a wavelength of 650 to 980 nm. In this case, when the dyestuff solution has a thickness of 25 to 100 μm, the magnitude of thermal lens effect does not change even if the intensity of control light is increased.

Furthermore, when the dyestuff solution has a thickness of 1000 μm, no specific merit was recognized and rather the beam shape of output signal light was adversely influenced by the refraction. Therefore, it is desired that the height h2 of the columnar body 20 is set to 200 to 500 μm. It is desired that the diameter D2 of the columnar body 20 is identical to the height h2 of the columnar body 20. It is desired that the height h2 of the columnar body 20 is set to a value in the range of 200 to 500 μm. In the above-described evaluation test, the "magnitude of thermal lens effect" is clearly detectable and compared as the size of a ring on a cross section of output signal light in the ring beam system, or as the deflection angle of signal light output from the thermal lens forming element in the circular beam system.

The coin-shaped optical cell 26 can be manufactured according to the following method.

The method includes machining two disc-shaped members having an outer diameter D3 of 8 mm (a dyestuff solution filling port 28 having a diameter of 1 mm is provided on one member) from a plate member made of quartz glass and having a thickness T3 of 500 μm, cutting and polishing a member having an outer diameter D3 of 8 mm and an inner diameter D4 of 7 mm and having a height h2 (T4) of 500 μm from a tubular member made of quartz glass, cutting and polishing a columnar member (dam 27) having a height h2' of 495 μm and an outer diameter D5 of 1.5 mm and an inner diameter D2 of 0.5 mm from a tubular member made of quartz glass, and fusion bonding these members.

For example, the lid 25 has the thickness T5 of 500 μm and a diameter D6 of 3 mm. The solution channel 22 provides a clearance of 5 μm between an inner wall of the coin-shaped optical cell 26 and the columnar dam 27. A dyestuff solution can be supplied to the columnar space 20 via the solution channel 22, by repeating the steps of filling the second chamber 23 with the dyestuff solution and then reducing the entire pressure to a normal level. After the columnar first chamber 20 is filled with the dyestuff solution, adjustment of the dyestuff solution to be poured is performed to leave the ellipsoidal bubble 24 inscribing a cuboid having a square bottom surface with one side length D8 of approximately 1 mm and a height of 500 μm in the second chamber 23. When the bubble 24 is observed from the direction parallel to the optical axis 200 of the coin-shaped cell, the side length D8 of the square bottom surface of the cuboid inscribed by the bubble 24 is the diameter of a circle. Hence, the side length D8 of the square bottom surface of the cuboid inscribed by the bubble 24 can be referred to as "diameter of the bubble 24."

Description relating to adhesive, dyestuff, solvent, and inert gas in the first embodiment can be equally applied to the second embodiment.

A signal light source emitting a laser having a wavelength of 1550 nm and a control light source emitting a laser having a wavelength of 860 nm were used. The thermal lens forming element 2 (optical path length=500 μm) was filled with a solution containing 5,9,14,18,23,27,32,36-octa-n-butoxy-2,3-naphthalocyanine (as a dyestuff) dissolved in the solvent #1 at the concentration of 0.1 weight %.

[Role of Bubble]

The role of the bubble 24 (inert gas) confined in the second chamber 23 of this embodiment (illustrated in FIG. 2) is similar to that of the bubble 14 in the first embodiment. The bubble 24 can absorb an increase/decrease in the internal pressure of the coin-shaped optical cell 26, which is caused by thermal expansions of the optical cell 26 and the dyestuff solution when the temperature of the thermal lens forming element 2 is raised or lowered.

On the other hand, when the bubble 24 was not confined in the thermal lens forming element 2 of the embodiment (FIG. 2), it was confirmed that the internal pressure of the coin-shaped optical cell 26 reached an allowable bending stress (1.97 MPa) of quartz glass by a temperature rise of 50° C. in the element and cracks appeared from the corner of bonded glass members. Table 2 shows temperature variations in volume and internal pressure, calculated based on observation of the diameter D8 of the bubble 24 (inert gas) confined in the second chamber 23 of the thermal lens forming element 2 with a microscope in the temperature range of 30 to 70° C.

The coin-shaped optical cell 26, in which the first chamber 20, the second chamber 23, the solution channel 22, and the dyestuff solution filling port 28 are defined as an internal space of the thermal lens forming element 2 having a total volume of 19 μL, was used. The used inert gas was a nitrogen gas. The dyestuff solution was poured into the thermal lens forming element 2 in a nitrogen atmosphere glove box, so as to leave a bubble having a diameter D8 of approximately 1 mm. Then, the lid 25 was bonded to the coin-shaped optical cell 26 with an epoxy adhesive of the room temperature curing-type. After sealed in this manner, the coin-shaped optical cell 26 was placed on a hot plate positioned under a stereo microscope to accurately measure the diameter of the bubble at an adjusted temperature.

As the second chamber 23 of the thermal lens forming element 2 has a height of 500 μm, the shape of a bubble having a diameter of approximately 1 mm is an "ellipsoid" not a "sphere." The following formula [1] defines the volume V of an ellipsoid inscribing a cuboid defined by three sides having the lengths 2a, 2b, and 2c.

[Formula 1]

$$V = 4\pi abc/3 \qquad [1]$$

Furthermore, the following formula [2] defines the internal pressure of a bubble, in which T represents the temperature [K], V represents the volume, n represents a number of molecules of gas, and R represents the gas constant.

[Formula 2]

$$P = nRT/V \quad [2]$$

TABLE 2

Temperature Variation In Diameter/Volume/Internal Pressure Of Bubble Confined In Thermal Lens Forming Element

| TEMPERATURE [K] | DIAMETER OF BUBBLE [mm] | VOLUME OF BUBBLE [μL] | INTERNAL PRESSURE [hPa] |
|---|---|---|---|
| 303.15 | 1.21 | 0.3833 | 1013 |
| 313.15 | 1.08 | 0.3054 | 1313 |
| 323.15 | 0.94 | 0.2313 | 1789 |
| 333.15 | 0.80 | 0.1676 | 2547 |
| 343.15 | 0.66 | 0.1140 | 3854 |

Figure 16:
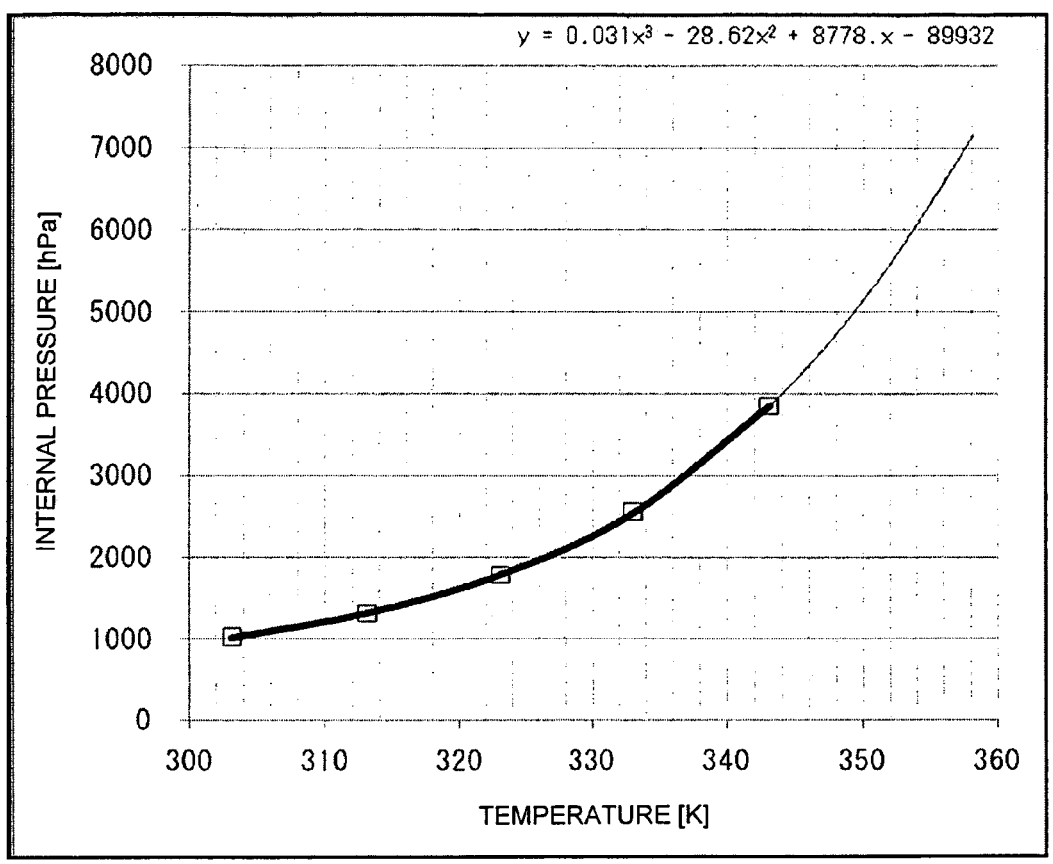
FIG. 16 illustrates a relationship between temperature and internal pressure, which can be calculated based on a volumetric change of a bubble confined in a thermal lens forming element according to the present invention.

FIG. 16 illustrates a relationship between temperature and internal pressure, obtained from the bubble data in table 2. The obtained relationship accurately accords with a polynominal approximation. In FIG. 16, a bold curve represents calculated values based on measured values and a thin curve represents an exterpolated curve according to the polynominal approximation. It is understood that the pressure in the first chamber 20 and the second chamber 23 of the thermal lens forming element 2 is approximately 4 atm at 70° C. and reaches approximately 7 atm when the temperature rises up to 85° C. The volume of the bubble 24 at 30° C. is approximately 2% of the total volume (19 μL) of the internal space of the thermal lens forming element 2 (i.e., the first chamber 20, the second chamber 23, the solution channel 22, and the dyestuff solution filling port 28). Increasing the size of a bubble by 5% at a low temperature can further suppress an increase in internal pressure responsive to an increase in temperature.

[Orientation and Characteristics of Thermal Lens Element]

Adjustment of an optical system was performed using the circular beam system optical path deflecting apparatus illustrated in FIG. 5, which incorporates the thermal lens forming element 2 according to the second embodiment instead of using the thermal lens forming element 1 according to the first embodiment. Adjustment and characteristics measurement were performed at 25° C., with signal light (and control light) having the optical axis 200 parallel to the vertical direction. More specifically, the apparatus was set to have an orientation perpendicular to the direction of gravity. According to the above-described orientation settings, the coin-shaped thermal lens forming element 2 can operate in the direction corresponding to the "standing state of a coin." The control light was set to have a wavelength of 860 nm and an intensity of 7.3 mW. The signal light was set to have a wavelength of 1550 nm and an intensity of 2 mW.

Table 3 shows a measurement/comparison result in intensity between the progressive signal light 521 and the deflected signal light 531 responsive to on/off of control light, corresponding to the intensity of signal light incident on the circular beam system optical path deflecting apparatus (signal light emitted from an optical fiber).

TABLE 3

Switching Characteristics Of Circular Beam System Optical Path Deflecting Apparatus (With Optical Axis Perpendicular To Gravity Direction)

| SIGNAL LIGHT (1550 nm, 2.0 mW) & CONTROL LIGHT (860 nm, 7.3 mW) | WHEN CONTROL LIGHT IS OFF [dB] | WHEN CONTROL LIGHT IS ON [dB] |
|---|---|---|
| PROGRESSIVE SIGNAL LIGHT INTENSITY/INCIDENT SIGNAL LIGHT INTENSITY | −1.06 | −45.0 |
| DEFLECTED SIGNAL LIGHT INTENSITY/INCIDENT SIGNAL LIGHT INTENSITY | −43.0 | −1.93 |

Next, the above-described intensity ratio was measured by changing the orientation of the circular beam system optical path deflecting apparatus in increments of 45° (deg.) so as to rotate the orientation of the thermal lens forming element 2, while setting a rotational axis coinciding with the optical axis 200 of the signal light (and the control light). The intensity ratio showed a very small variation within ±0.2 dB.

Furthermore, the above-described intensity ratio was measured by changing the orientation of the circular beam system optical path deflecting apparatus in increments of 45° (deg.) while setting a rotational axis perpendicular to the optical axis 200 of signal light (and control light) and parallel to a disc-like plane of the coin-shaped thermal lens forming element 2. The intensity ratio showed a slightly large variation within ±0.5 dB.

In the above-described orientation changing measurement, the phenomenon of the intensity ratio increased extremely at a specific orientation of the apparatus was not observed. Furthermore, similar measurement was performed using the thermal lens forming element 1 including the cuboidal space 11 transmitting the signal light according to the first embodiment, instead of using the coin-shaped thermal lens forming element 2 according to the second embodiment. The intensity ratio showed a variation within ±0.6 dB.

As described above, the thermal lens forming element according to the present invention can reduce variation in thermal lens effect when the orientation of the thermal lens forming element is changed relative to the direction of gravity.

Comparative Embodiment 3

Figure 3A:
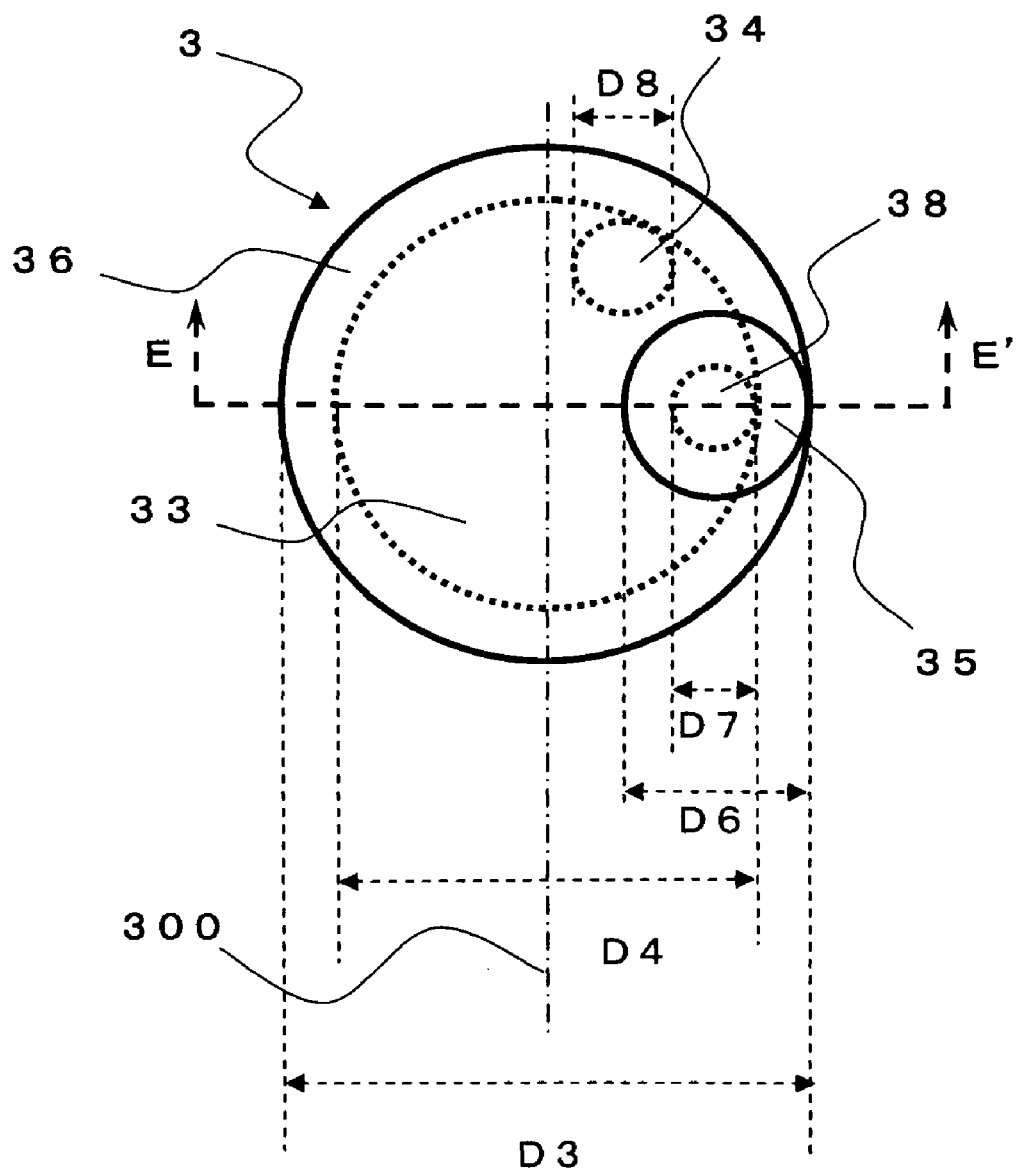
FIG. 3a illustrates a schematic arrangement of a thermal lens forming element, which is a comparative example of the second embodiment of the present invention.
Figure 3B:
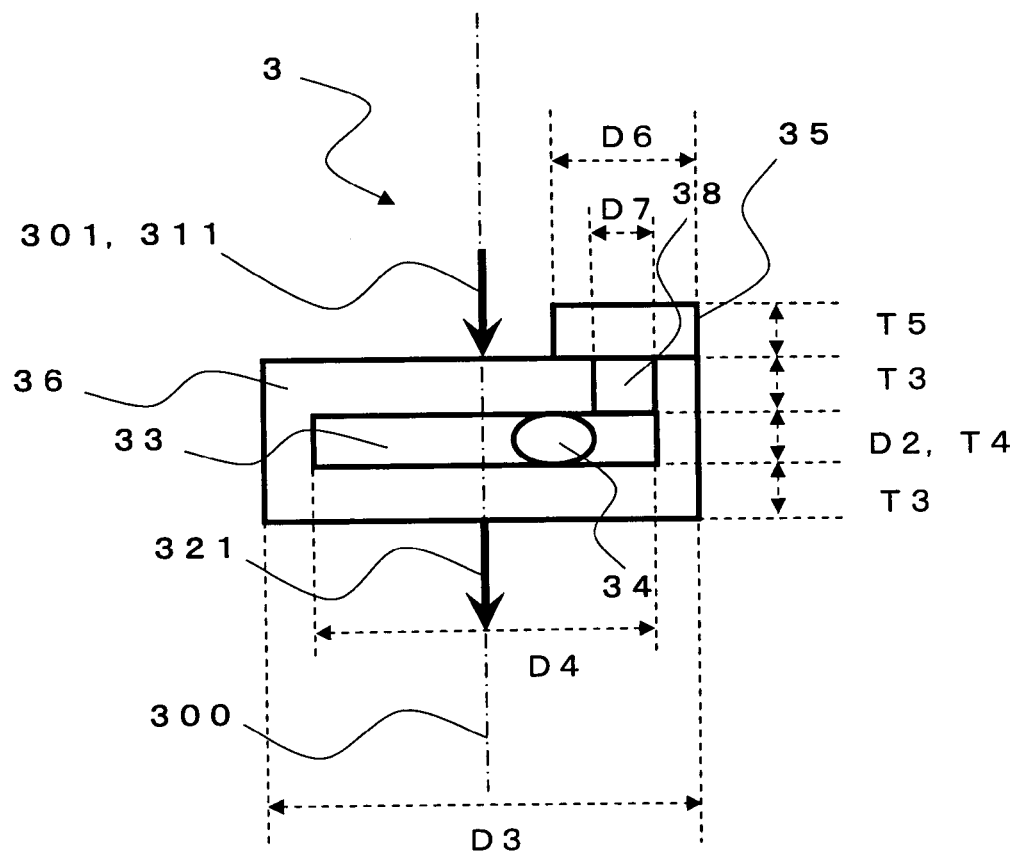

FIG. 3 illustrates a thermal lens forming element 3 according to this comparative example, which is different from the thermal lens forming element 2 (FIG. 2) according to the second embodiment in that the columnar dam 27 is removed. More specifically, a dyestuff solution and a bubble 34 of an inert gas are confined in a simple cylindrical space 33 of a coin-shaped optical cell 36. A lid 35 closes a dyestuff solution filling port 38 with an epoxy adhesive.

Except for the thermal lens forming element 3, this comparative embodiment uses apparatus, dyestuff, solvent, adjustment/measurement procedure similar to those described in the second embodiment. An optical axis 300 of signal light (and control light) extends in the vertical direction. More specifically, the apparatus was set to have an orientation perpendicular to the direction of gravity.

According to the above-described orientation settings, the coin-shaped thermal lens forming element 2 can operate in the direction corresponding to the "standing state of a coin." The control light was set to have a wavelength of 860 nm and an intensity of 7.3 mW. The signal light was set to have a wavelength of 1550 nm and an intensity of 2 mW.

Table 4 shows a measurement/comparison result in the intensity between the progressive signal light 521 and the deflected signal light 531 responsive to on/off of the control light, corresponding to the intensity of the signal light incident on the circular beam system optical path deflecting apparatus (signal light emitted from an optical fiber).

TABLE 4

Switching Characteristics Of Comparative Embodiment 3 (With Optical Axis Perpendicular To Gravity Direction)

| SIGNAL LIGHT (1550 nm, 2.0 mW) & CONTROL LIGHT (860 nm, 7.3 mW) | WHEN CONTROL LIGHT IS OFF [dB] | WHEN CONTROL LIGHT IS ON [dB] |
|---|---|---|
| PROGRESSIVE SIGNAL LIGHT INTENSITY/INCIDENT SIGNAL LIGHT INTENSITY | −1.14 | −42.9 |
| DEFLECTED SIGNAL LIGHT INTENSITY/INCIDENT SIGNAL LIGHT INTENSITY | −41.9 | −1.94 |

As understood from the comparison between table 3 and table 4, when the orientation of the apparatus is set to have the optical axis 300 of the signal light extending in the vertical direction (i.e., a direction perpendicular to the direction of gravity), the thermal lens forming element 3 according to the comparative embodiment 3 can possess optical switching characteristics comparable to those of the thermal lens forming element 2 according to the second embodiment of the present invention.

The above-described intensity ratio was measured by changing the orientation of the circular beam system optical path deflecting apparatus in increments of 45° (deg.) so as to rotate the orientation of the thermal lens forming element 3, while setting a rotational axis coinciding with the optical axis 300 of signal light (and control light). The intensity ratio showed a large variation whose value is 1 to 2 dB.

Furthermore, the above-described intensity ratio was measured by changing the orientation of the circular beam system optical path deflecting apparatus in increments of 45° (deg.) while setting a rotational axis perpendicular to the optical axis 300 of signal light (and control light) and parallel to a disc-like plane of the coin-shaped thermal lens forming element 3. The intensity ratio showed a very large variation whose maximum value reaches ±5 dB.

In the above-described orientation changing measurement, the phenomenon of the intensity ratio increased extremely at a specific orientation of the apparatus was observed several times. The signal light intensity ratio temporarily showed a variation of ±10 dB. This is because the bubble 34 (inert gas) confined in the space 33 of the coin-shaped optical cell 36 can freely move around the space 33 across the optical path of the control light (signal light) during the orientation change of the apparatus.

As understood from the comparative embodiment 3, if a thermal lens forming element does not include a dam capable of appropriately separating the inner space of its optical cell, intense "thermal convection" of a dyestuff solution occurs at or near a portion where the temperature has locally increased. The thermal convection adversely influences the formation of a thermal lens during the orientation change of the element.

On the other hand, as described in the second embodiment, the thermal lens forming element 1 (or 2) according to the present invention includes the dam 17 (or 27) capable of partitioning an inner space into separate spaces having appropriate volumes while keeping symmetry. Thus, the thermal lens forming element 1 (or 2) according to the present invention can minimize variation in optical switching characteristics during the orientation change of the element. Furthermore, the dam 17 (or dam 27) of the thermal lens forming element 1 (or 2) can prevent the confined bubble 14 (or bubble 24) from moving across the optical path of control light (or signal light) due to increase/decrease of the internal pressure.

The present invention is not restricted to the above-described embodiment and various modifications can be allowed in a range within the scope thereof. This application claims priority from Japanese Patent Application No. 2007-333311 filed Dec. 25, 2007 and Japanese Patent Application No. 2008-001808 filed Jan. 9, 2008, which are hereby incorporated by reference herein in their entirety.

INDUSTRIAL APPLICABILITY

The present invention can be effectively used in the fields relating to optical communications and optical information processing.

The invention claimed is:

1. A thermal lens forming element including an optical cell filled with a solution containing a dyestuff dissolved in a solvent, wherein the dyestuff does not absorb light having a wavelength identical to that of signal light and absorbs control light,
   wherein the optical cell includes a control light absorbing region where at least the control light can focus,
   wherein the solvent has a viscosity of 0 to 3 mPa·s at 160° C. or above, and a ratio of the viscosity of the solvent at 160° C. to a viscosity of the solvent at 40° C. is not less than 1 and not greater than 6,
   wherein the control light absorbing region is convergently irradiated with the control light having a wavelength selected from a wavelength band absorbed by the control light absorbing region and the signal light having a wavelength selected from a wavelength band not absorbed by the control light absorbing region, wherein the control light and the signal light have convergence points identical or different in their positions, wherein a thermal lens is formed based on a distribution of the refractive index reversibly formed due to an increase in temperature at a portion where the control light is absorbed or its peripheral region in the control light absorbing region,
   wherein the thermal lens forming element realizes the following states according to on/off of the control light:
   a state where the converged signal light is output from the thermal lens forming element with an ordinary divergence angle in a progressive direction if the control light is not emitted and the thermal lens is not formed;
   a state where the converged signal light is output from the thermal lens forming element with a divergence angle larger than the ordinary divergence angle if the convergence point of the control light agrees in position with the convergence point of the signal light when the thermal lens is formed under irradiation of the control light; and
   a state where the converged signal light is output from the thermal lens forming element with a divergence angle different from the ordinary divergence angle in a direction different from the progressive direction if the convergence point of the control light disagrees in position with the convergence point of the signal light when the thermal lens is formed under irradiation of the control light.

2. The thermal lens forming element according to claim 1, wherein the control light absorbing region is configured as a columnar body or an N prismatic body (wherein N is an integer equal to or greater than 4) circumscribing the columnar body, which has a central axis coinciding with an optical axis of the signal light traveling progressively under no irradiation of the control light, wherein the signal light is incident perpendicularly on one bottom surface of the columnar body or the N prismatic body circumscribing the columnar body and output from the other bottom surface.

3. The thermal lens forming element according to claim 2, wherein the height of the columnar body or the N prismatic body circumscribing the columnar body, which represents the distance between the bottom surfaces thereof, is equal to the diameter of the columnar body.

4. The thermal lens forming element according to claim 3, wherein the height of the columnar body or the N prismatic body circumscribing the columnar body, which represents the distance between the bottom surfaces thereof, is 200 to 500 μm, and the diameter of the columnar body is 200 to 500 μm.

5. The thermal lens forming element according to claim 2, wherein the height of the columnar body or the N prismatic body circumscribing the columnar body, which represents the distance between the bottom surfaces thereof, is 200 to 500 μm, and the diameter of the columnar body is 200 to 500 μm.

6. The thermal lens forming element according to claim 2, wherein the control light absorbing region configured as the columnar body or the N prismatic body circumscribing the columnar body is connected to a second chamber via a thin tube having an inner diameter of 10 to 50 μm or a dam providing a clearance of 5 to 20 μm, and the second chamber is filled with the dyestuff solution and an inert gas.

7. The thermal lens forming element according to claim 1, wherein the dyestuff is a phthalocyanine derivative selected from the group including 1,5,9,13-tetra-tert-butyl copper phthalocyanine, 1,5,9,13-tetra-tert-butyl oxyvanadium phthalocyanine, 2,11,20,29-tetra-tert-butyl oxyvanadium naphthalocyanine, and 5,9,14,18,23,27,32,36-octa-n-butoxy-2,3-naphthalocyanine.

8. The thermal lens forming element according to claim 1, wherein the solvent is a mixed solvent of four structural isomer components (having the same molecular weight): including 1-phenyl-1-(2,5-xylyl)ethane, 1-phenyl-1-(2,4-xylyl)ethane, 1-phenyl-1-(3,4-xylyl)ethane, and 1-phenyl-1-(4-ethylphenyl)ethane.

* * * * *